(12) United States Patent
Lee et al.

(10) Patent No.: US 11,778,419 B2
(45) Date of Patent: Oct. 3, 2023

(54) ELECTRONIC DEVICE DETECTING LOCATION AND METHOD THEREOF

(71) Applicant: Samsung Electronics Co., Ltd., Gyeonggi-do (KR)

(72) Inventors: Youngpo Lee, Gyeonggi-do (KR); Taeyoon Kim, Gyeonggi-do (KR); Dukhyun Chang, Gyeonggi-do (KR); Hyeonggeon Lee, Gyeonggi-do (KR); Chaiman Lim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/079,927

(22) Filed: Oct. 26, 2020

(65) Prior Publication Data

US 2021/0211839 A1 Jul. 8, 2021

(30) Foreign Application Priority Data

Jan. 2, 2020 (KR) ........................ 10-2020-0000119

(51) Int. Cl.
*H04W 4/029* (2018.01)
*H04W 4/02* (2018.01)
(Continued)

(52) U.S. Cl.
CPC .......... *H04W 4/029* (2018.02); *H04W 4/026* (2013.01); *H04W 4/80* (2018.02); *H04W 84/12* (2013.01)

(58) Field of Classification Search
CPC ....... H04W 4/029; H04W 4/026; H04W 4/80; H04W 84/12
See application file for complete search history.

(56) References Cited

U.S. PATENT DOCUMENTS 7,218,938 B1 5/2007 Lau et al.
8,611,920 B2 12/2013 Lau et al.
(Continued)

FOREIGN PATENT DOCUMENTS

KR 10-2018-0028697 A 3/2018
KR 10-2018-0108192 A 10/2018
KR 10-2019-0020940 A 3/2019

OTHER PUBLICATIONS

International Search Report dated Feb. 22, 2021.
European Search Report dated Aug. 29, 2022.

*Primary Examiner* — Steven S Kelley
(74) *Attorney, Agent, or Firm* — Cha & Reiter, LLC

(57) ABSTRACT

Disclosed is a location detecting method of an electronic device including determining whether the electronic device enters a first region including a first location that is a specific path and/or specific region, when the electronic device enters the first region, selecting a signal type capable of being supported by the electronic device among a signal type list of items defined as moving path data corresponding to the first location, distinguishing the first data, in which a parameter feature is present, and second data having a maintenance pattern for a moving path, among the signal type, comparing first data of the moving path data with first data of measurement data measured by the electronic device, and when the first data of the moving path data corresponds to the first data of the measurement data, comparing patterns after pre-processing both second data of the moving path data and second data of the measurement data to determine whether to enter the first location.

18 Claims, 22 Drawing Sheets

(51) Int. Cl.
*H04W 4/80* (2018.01)
*H04W 84/12* (2009.01)

(56) References Cited

U.S. PATENT DOCUMENTS

| | | | | |
|---|---|---|---|---|
| 8,624,725 B1* | 1/2014 | MacGregor | | H04W 12/06 |
| | | | | 342/450 |
| 8,798,924 B2 | 8/2014 | Haverinen | | |
| 8,886,220 B2 | 11/2014 | Lau et al. | | |
| 9,078,104 B2 | 7/2015 | Haverinen | | |
| 9,151,621 B2 | 10/2015 | Haverinen | | |
| 9,279,694 B1 | 3/2016 | Sheikh | | |
| 9,599,473 B2 | 3/2017 | Haverinen | | |
| 9,674,672 B1 | 6/2017 | Haverinen et al. | | |
| 9,683,851 B2 | 6/2017 | Haverinen | | |
| 9,933,508 B2 | 4/2018 | Haverinen et al. | | |
| 10,156,447 B1 | 12/2018 | Nagpal et al. | | |
| 10,249,116 B1* | 4/2019 | Nagpal | | G01C 21/206 |
| 10,422,646 B1 | 9/2019 | Ohab et al. | | |
| 10,433,102 B2 | 10/2019 | Kim et al. | | |
| 10,477,506 B2 | 11/2019 | Lee et al. | | |
| 10,652,690 B2 | 5/2020 | Lau et al. | | |
| 10,768,313 B2 | 9/2020 | Jun et al. | | |
| 10,873,828 B2 | 12/2020 | Lau et al. | | |
| 2004/0198325 A1* | 10/2004 | Brueckner | | H04L 12/6418 |
| | | | | 455/412.1 |
| 2009/0043504 A1* | 2/2009 | Bandyopadhyay | | G01S 19/48 |
| | | | | 701/469 |
| 2010/0066531 A1* | 3/2010 | Karr | | G06Q 10/00 |
| | | | | 340/539.1 |
| 2010/0081387 A1* | 4/2010 | Shi | | H04B 17/318 |
| | | | | 455/62 |
| 2011/0161855 A1* | 6/2011 | Prehofer | | H04M 1/72457 |
| | | | | 715/771 |
| 2011/0306354 A1* | 12/2011 | Ledlie | | H04W 4/029 |
| | | | | 455/456.1 |
| 2013/0303185 A1* | 11/2013 | Kim | | H04W 4/029 |
| | | | | 455/456.1 |
| 2013/0337847 A1* | 12/2013 | Sridhara | | G01S 13/876 |
| | | | | 455/456.6 |
| 2014/0066098 A1* | 3/2014 | Stern | | H04L 12/2801 |
| | | | | 455/456.3 |
| 2014/0335893 A1* | 11/2014 | Ronen | | G01S 5/02524 |
| | | | | 455/456.1 |
| 2014/0335894 A1* | 11/2014 | Wirola | | G01S 5/0252 |
| | | | | 455/456.1 |
| 2015/0038168 A1 | 2/2015 | Lau et al. | | |
| 2015/0248642 A1* | 9/2015 | Florance | | H04W 4/029 |
| | | | | 705/313 |
| 2015/0281875 A1* | 10/2015 | Shin | | H04W 4/80 |
| | | | | 455/41.2 |
| 2015/0350825 A1 | 12/2015 | Kim et al. | | |
| 2016/0018507 A1* | 1/2016 | Chen | | G01S 5/02524 |
| | | | | 455/456.2 |
| 2016/0183116 A1* | 6/2016 | Zhang | | H04W 64/00 |
| | | | | 455/456.1 |
| 2018/0077671 A1 | 3/2018 | Lee et al. | | |
| 2018/0091946 A1* | 3/2018 | Venkatraman | | H04L 43/065 |
| 2018/0206067 A1 | 7/2018 | Kim et al. | | |
| 2018/0275285 A1 | 9/2018 | Jun et al. | | |
| 2019/0069266 A1 | 2/2019 | Han et al. | | |
| 2019/0304217 A1 | 10/2019 | Hamidifar et al. | | |
| 2020/0037162 A1* | 1/2020 | Manikantan Shila | | H04W 4/029 |
| 2020/0100203 A1 | 3/2020 | Lee et al. | | |
| 2020/0260403 A1* | 8/2020 | Raghothaman | | H04W 4/02 |
| 2020/0304953 A1* | 9/2020 | Georgy | | G01S 5/02522 |
| 2022/0383253 A1* | 12/2022 | Neumann | | G06F 16/24573 |

\* cited by examiner

| 1D VIRTUAL MARK 201 ||||||
|---|---|---|---|---|---|
| Sampling Rate | Duration |||||
| Timestamp 1 | $MagX_1$ | $MagY_1$ | $MagZ_1$ |||
| ⋮ | ⋮ | ⋮ | ⋮ |||
| Timestamp N | $MagX_N$ | $MagY_N$ | $MagZ_N$ |||
| Sampling Rate | Duration |||||
| Timestamp 1 | $AccX_1$ | $AccY_1$ | $AccZ_1$ |||
| ⋮ | ⋮ | ⋮ | ⋮ |||
| Timestamp N | $AccX_N$ | $AccY_N$ | $AccZ_N$ |||
| Sampling Rate | Duration |||||
| Timestamp 1 | $Roll_1$ | $Pitch_1$ | $Yaw_1$ | $AnvX_1$ $AnvY_1$ $AnvZ_1$ ||
| ⋮ | ⋮ | ⋮ | ⋮ | ⋮ ⋮ ⋮ ||
| Timestamp N | $Roll_N$ | $Pitch_N$ | $Yaw_N$ | $AnvX_N$ $AnvY_N$ $AnvZ_N$ ||
| Number of WLAN Aps ||||||
| AP1 signal strength | ... | APN signal strength ||||
| Number of Cell Number ||||||
| Cell1 signal strength | ... | CellN signal strength ||||

- MAGNETIC SENSING VALUE 210
- ACCELERATION SENSING VALUE 220
- GYRO SENSING VALUE 230
- FIRST WIRELESS COMMUNICATION SIGNAL 240
- SECOND WIRELESS COMMUNICATION SIGNAL 250

FIG.2

○ REGION FOR DETERMINING CELLULAR SIGNAL-BASED PROXIMITY

⬢ REGION FOR DETERMINING WLAN SIGNAL-BASED PROXIMITY

● FIRST LOCATION (SPECIFIC INDOOR LOCATION)

○ REGION FOR DETERMINING CELLULAR SIGNAL-BASED PROXIMITY
▨ REGION FOR DETERMINING WLAN SIGNAL-BASED PROXIMITY
● FIRST LOCATION (SPECIFIC INDOOR LOCATION)

○ REGION FOR DETERMINING CELLULAR SIGNAL-BASED PROXIMITY

▨ REGION FOR DETERMINING WLAN SIGNAL-BASED PROXIMITY

● FIRST LOCATION (SPECIFIC INDOOR LOCATION)

ELECTRONIC DEVICE DETECTING LOCATION AND METHOD THEREOF

CROSS-REFERENCE TO RELATED APPLICATION(S)

This application is based on and claims priority under 35 U.S.C. § 119 to Korean Patent Application No. 10-2020-0000119, filed on Jan. 2, 2020, in the Korean Intellectual Property Office, the disclosure of which is incorporated by reference herein its entirety.

BACKGROUND

1. Field

The disclosure relates to an electronic device for detecting a location, and a method thereof.

2. Description of Related Art

To detect the location of an electronic device, the electronic device may estimate a user's location, using a satellite signal received using a Global Positioning System (GPS). Accurate detection of the position of the electronic device as well as a mapping of the surroundings in an efficient manner is important.

The above information is presented as background information only to assist with an understanding of the disclosure. No determination has been made, and no assertion is made, as to whether any of the above might be applicable as prior art with regard to the disclosure.

SUMMARY

In accordance with an aspect of the disclosure, a location detecting method of an electronic device comprises determining whether the electronic device enters a first region including a first location that is along a specific path or in a specific region; when determining that the electronic device entered the first region, selecting a signal type capable of being supported by the electronic device among a signal type list of items defined as moving path data corresponding to the first location; distinguishing the first data, in which a parameter feature is present, and second data having a maintenance pattern for a moving path, among the signal type; comparing first data of the moving path data with first data of measurement data measured by the electronic device; and when the first data of the moving path data corresponds to the first data of the measurement data, comparing patterns after pre-processing both second data of the moving path data and second data of the measurement data to determine entry to the first location.

In accordance with another aspect of the disclosure, an electronic device comprises a sensor module configured to sense sensing data; a wireless communication module configured to transmit or receive a wireless signal; a memory configured to store a virtual marker platform; and a processor operatively connected to the sensor module and the memory, wherein the processor is configured to: determine whether the electronic device enters a first region including a first location that is a long a specific path or in a specific region; when determining that the electronic device entered the first region, select a signal type capable of being supported by the electronic device among a signal type list of items defined as moving path data corresponding to the first location; distinguish first data, in which a parameter feature is present, and second data having a maintenance pattern for a moving path, among the signal type; compare the first data of the moving path data with first data of measurement data measured by the electronic device; and when the first data of the moving path data corresponds to the first data of the measurement data, compare patterns after pre-processing both second data of the moving path data and second data of the measurement data to determine entry to the first location.

In accordance with another aspect of the disclosure, a location detecting method of an electronic device, the method comprises determining whether the electronic device enters a first region including a first location that is along a specific path or in a specific region; when determining that the electronic device entered the first region, comparing first data, in which a parameter feature is present, among moving path data corresponding to the first location with first data of measurement data measured by the electronic device; comparing data at least part of at least one or more entry points arranged in an edge region of the first location with the measurement data; changing a coordinate system of the measurement data to correspond to a coordinate system at a point in time when the moving path data is generated; and when the first data of the moving path data corresponds to the first data of the measurement data, comparing patterns after pre-processing both second data having a maintenance pattern for a moving path of the moving path data and second data of the measurement data to determine whether to enter the first location.

Other aspects, advantages, and salient features of the disclosure will become apparent to those skilled in the art from the following detailed description, which, taken in conjunction with the annexed drawings, discloses certain embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 is a diagram illustrating a 1D virtual marker according to an embodiment;

DETAILED DESCRIPTION

Figure 1:
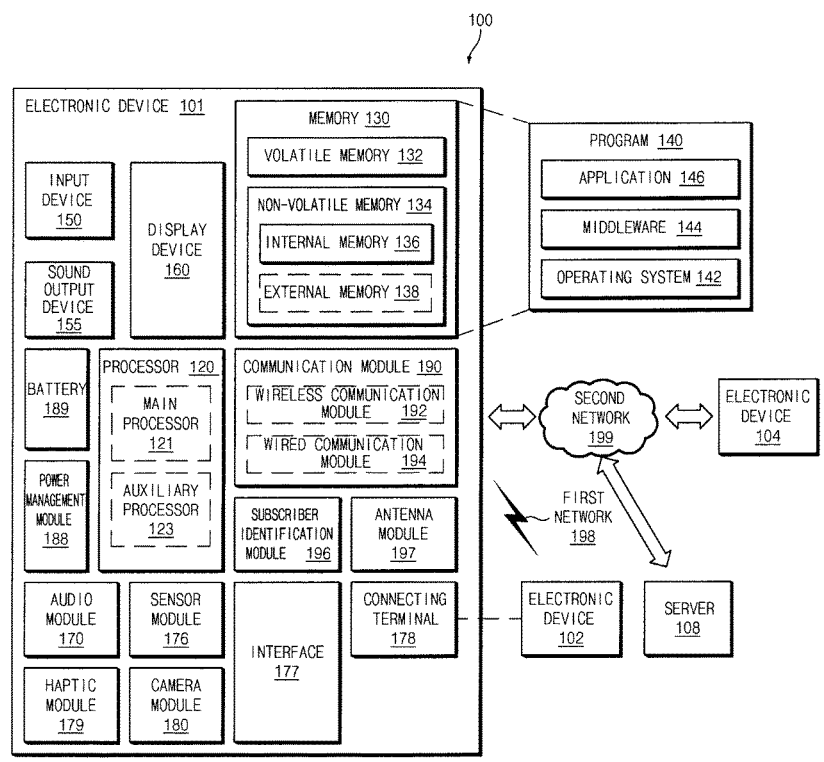
FIG. 1 is a block diagram illustrating an electronic device in a network environment according to certain embodiments.

To more accurately detect the location of the electronic device indoors, the electronic device may transmit a cellular and/or wireless LAN signal received by the electronic device to the server, and may track the location of the electronic device and/or user based on the locations of the cellular and/or wireless LAN base stations.

The electronic device may measure the user's location in the form of coordinates (such as latitude, longitude), and may provide a service, using the corresponding coordinates. For another example, the electronic device may set up a map for a specific indoor place, and may express the location of the electronic device on the map as coordinates on the map. To detect the location of an electronic device indoors, the electronic device may generate an indoor geographic map. The indoor map may be received from an outside source, such as internet sources that have building plans for each building. Alternatively, the indoor geographic map can be generated through an algorithm and/or an indoor wireless signal map indicating cellular and/or wireless LAN signal values measured at several points on a map. When the electronic device generates the indoor geographic map and/or indoor wireless signal map to detect a location, there is a need for continuous maintenance work for generating the indoor geographic map and/or indoor wireless signal map. Furthermore, when the indoor geographic map and/or indoor wireless signal map is generated, measurement errors may occur due to environmental changes, such as unexpected interference, and excessive reflection, to name a few.

The electronic device may use a Bluetooth beacon signal to detect a location more accurately. When the electronic device uses the Bluetooth beacon signal to detect a location, there is a need to install additional infrastructure facilities such as a Bluetooth beacon generator.

To detect a location more accurately, the electronic device may use a geofencing technology for determining whether the electronic device enters a specific place, using a wireless signal footprint. When the electronic device uses geofencing location detection, the electronic device may detect entry into a specific place, using cellular and/or wireless LAN signals, thereby increasing the missed detection probability and/or false alarm probability.

Aspects of the disclosure are to address at least the above-mentioned problems and/or disadvantages and to provide at least the advantages described below. Accordingly, an aspect of the disclosure is to provide a technology capable of improving the accuracy of determining whether an electronic device has entered a specific indoor place.

Hereinafter, certain embodiments of the disclosure will be described with reference to accompanying drawings. However, it should be understood that this is not intended to limit the disclosure to specific implementation forms and includes various modifications, equivalents, and/or alternatives of embodiments of the disclosure.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

To detect the location of the electronic device 100, the electronic device may use a Global Positioning System (GPS). To more accurately detect the location of the electronic device indoors, the electronic device may transmit a cellular and/or wireless LAN signal received by the electronic device to the server, and may track the location of the electronic device and/or user based on the locations of the cellular and/or wireless LAN base stations. To detect the location of an electronic device 100 indoors, the electronic device may generate an indoor geographic map. The indoor map may be received from an outside source, such as internet sources that have building plans for each building. Alternatively, the indoor geographic map can be generated through an algorithm and/or an indoor wireless signal map indicating cellular and/or wireless LAN signal values measured at several points on a map. When the electronic device generates the indoor geographic map and/or indoor wireless signal map to detect a location, there is a need for continuous maintenance work for generating the indoor geographic map and/or indoor wireless signal map. Furthermore, when the indoor geographic map and/or indoor wireless signal map is generated, measurement errors may occur due to environmental changes, such as unexpected interference, and excessive reflection, to name a few.

The electronic device may use a Bluetooth beacon signal to detect a location more accurately. When the electronic device uses the Bluetooth beacon signal to detect a location, there is a need to install additional infrastructure facilities such as a Bluetooth beacon generator.

To detect a location more accurately, the electronic device may use a geofencing technology for determining whether the electronic device enters a specific place, using a wireless signal footprint. When the electronic device uses geofencing location detection, the electronic device may detect entry into a specific area, using cellular and/or wireless LAN signals, thereby increasing the missed detection probability and/or false alarm probability.

FIG. 2 is a diagram 200 illustrating a one-dimensional (1D) virtual mark 201 according to an embodiment. The 1D virtual mark 201 includes listings for readings of a magnetic sensor, an accelerometer, a gyroscope, measured short range wireless communication signals, and measured cellular wireless communication signals. The readings from the magnetic sensor can be stored as magnetic sensing values 210 which includes timestamped magnitude readings in the X-axis (MagX1), Y-axis (MagY1), and Z-axis (MagZ1). The readings from the accelerometer includes timestamped readings of acceleration in the X-axis (AccX), Y-axis (AccY), and Z-axis (AccZ). The readings from the gyroscope can include also timestamped readings (roll, pitch, yaw, AnvX, AnvY, AnvZ). The ID virtual mark can also include readings of access points and cellular towers.

The 1D virtual mark 201 can be used to compare readings at various times (timestamps) to virtual markers of known locations (see FIGS. 3, 310, 320, and 330) in the user's vicinity. Based on the characteristic of the magnetic fields 210, first and second wireless communication signals 240, 250, the location of the user can be determined, while the accelerometer and gyroscope readings can be used to track the device.

Referring to FIG. 2, the 1D virtual marker 201 may include sensing values including information in the form of a 1D line among virtual markers (VMs) for displaying information about a specific space and/or location. The 1D virtual marker 201 may be stored in a memory (e.g., the memory 130 of FIG. 1) of an electronic device (e.g., the electronic device 101 of FIG. 1). The 1D virtual marker 201 may include a magnetic sensing value 210, an acceleration sensing value 220, a gyro sensing value 230, a value of a first wireless communication signal 240, and/or a value of a second wireless communication signal 250.

In an embodiment, the magnetic sensing value 210 may include a magnitude value for each orientation of the magnetic field measured at a specific speed, in a specific space and/or location depending on a specified sampling rate. To measure the magnetic sensing value 210, the magnitude value for each orientation of the magnetic field may be measured during a specified measurement time (Duration). The time required to measure the magnitude value of the magnetic field for each orientation each time may be set to the value of a measurement time. For example, when the sampling rate is 1 Hz and the measurement time is 0.1 seconds, the electronic device 101 may measure the magnitude value of the magnetic field for each orientation every 1 second for 0.1 seconds. The measurement of the magnitude value for each orientation of the magnetic field may be maintained for 0.1 seconds every time. Accordingly, the measurement of the magnetic field may be performed from 0 to 0.1 seconds, from 1.0 to 1.1 seconds, . . . , from N.0 to N.1 seconds ('N' is a natural number).

In an embodiment, the electronic device 101 may measure a magnetic field in a specific space and/or location, using a magnetic field sensor included in a sensor module (e.g., the sensor module 176 in FIG. 1). For example, the sensor module 176 may measure the magnetic field from the first time (Timestamp 1) to the N-th time (Timestamp N) ('N' is a natural number). In this case, the magnetic sensing value 210 may include the strength MagX1 in the X-axis direction of the magnetic field measured at the first time (Timestamp 1), the strength MagY1 in the Y-axis direction of the magnetic field measured at the first time (Timestamp 1), and the strength MagZ1 in the Z-axis direction of the magnetic field measured at the first time (Timestamp 1). Furthermore, the magnetic sensing value 210 may include the strength MagXN in the X-axis direction of the magnetic field measured at the N-th time (Timestamp N), the strength MagYN in the Y-axis direction of the magnetic field measured at the N-th time (Timestamp N), and the strength MagZN in the Z-axis direction of the magnetic field measured at the N-th time (Timestamp N).

In an embodiment, the acceleration sensing value 220 may include a magnitude value for each orientation of the acceleration of the electronic device 101 measured at a specific speed, in a specific space and/or location at a specified sampling rate. To measure the acceleration sensing value 220, the magnitude value for each orientation of the acceleration may be measured during a specified measurement time (Duration). The time required to measure the magnitude value of the acceleration for each orientation each time may be set to the value of a measurement time.

In an embodiment, the electronic device 101 may measure the acceleration in a specific space and/or location from the first time (Timestamp 1) to the N-th time (Timestamp N), using an accelerometer included in the sensor module 176. For example, the acceleration sensing value 220 may include the acceleration AccX1 in the X-axis direction of the electronic device 101 measured at the first time (Timestamp 1), the acceleration AccY1 in the Y-axis direction of 101 of the electronic device measured at the first time (Timestamp 1), and the acceleration AccZ1 in the Z-axis direction of the electronic device 101 measured at the first time (Timestamp 1). For another example, the acceleration sensing value 220 may include the acceleration AccXN in the X-axis direction of the electronic device 101 measured the N-th time (Timestamp N), the acceleration AccYN in the Y-axis direction of 101 of the electronic device measured the N-th time (Timestamp N), and the acceleration AccZN in the Z-axis direction of the electronic device 101 measured the N-th time (Timestamp N).

In an embodiment, the gyro sensing value 230 may include the value of an angular orientation to the ground of the electronic device 101, which is measured in a specific space and/or location at a specified sampling rate. To measure the gyro sensing value 230, an angular orientation value may be measured during a specified measurement time (Duration). The time required to measure the magnitude value of the angle for each orientation each time may be set to the value of a measurement time.

In an embodiment, the electronic device 101 may measure the angular orientation value to the ground in a specific space and/or location from the first time (Timestamp 1) to the N-th time (Timestamp N), using a gyroscope included in the sensor module 176. For example, the gyro sensing value 230 may include a roll value Roll1 of the electronic device 101 measured at the first time (Timestamp 1), a measured pitch value Pitch1 of the electronic device 101, and a measured yaw value Yaw1 of the electronic device 101. For another example, the gyro sensing value 230 may include a roll value RollN of the electronic device 101 measured at the N-th time (Timestamp N), a measured pitch value PitchN of the electronic device 101, and a measured yaw value YawN of the electronic device 101.

In an embodiment, the gyro sensing value 230 may include a magnitude value for each orientation of the angular acceleration of the electronic device 101 measured at a specific speed, in a specific space and/or location at a specified sampling rate. The gyro sensing value 230 may measure a magnitude value for each orientation of an angular acceleration during a specified measurement time (Duration). The electronic device 101 may measure the angular acceleration in a specific space and/or location from the first time (Timestamp 1) to the N-th time (Timestamp N), using the gyroscope included in the sensor module 176. For example, the gyro sensing value 230 may include the angular acceleration AnvX1 in the X-axis direction of the electronic device 101 measured at the first time (Timestamp 1), the angular acceleration AnvY1 in the Y-axis direction of 101 of the electronic device measured at the first time (Timestamp 1), and the angular acceleration AnvZ1 in the Z-axis direction of the electronic device 101 measured at the first time (Timestamp 1). For another example, the gyro sensing value 230 may include the angular acceleration AnvXN in the X-axis direction of the electronic device 101 measured at the N-th time (Timestamp N), the angular acceleration AnvYN in the Y-axis direction of 101 of the electronic device measured at the N-th time (Timestamp N), and the angular acceleration AnvZN in the Z-axis direction of the electronic device 101 measured at the N-th time (Timestamp N). In an embodiment, the first wireless communication signal 240 may be a strength value of an access point (AP) signal measured by a wireless communication module (e.g., the wireless communication module 192 of FIG. 1). The first wireless communication signal 240 may include information associated with the number of AP signals of a broadband LAN (WLAN). The first wireless communication signal 240 may include information associated with the strength of the AP signal measured in a specific space and/or location. For example, the first wireless communication signal 240 may include a value from the strength of the first AP signal (AP1 signal strength) to the strength of the N-th AP signal (APN signal strength).

In an embodiment, the second wireless communication signal 250 may be a strength value of a cell signal of cellular communication measured by the wireless communication module 192. The second wireless communication signal 250 may include information associated with the number of cells. The second wireless communication signal 250 may include information associated with the strengths of the first to N-th cell signals measured in a specific space and/or location. For example, the second wireless communication signal 250 may include values from the strength of the first cell signal (Cell1 signal strength) to the strength of the N-th cell signal (cellN signal strength).

Accordingly, for each timestamp 1 . . . N, magnetic sensing values 210 (in three dimensions), acceleration sensing values 220 (in three dimensions), the gyro sensing value 230 (in three dimensions), strength of the first wireless communication signal 240, and strength of the second wireless communication signal 250 can be stored. Accordingly, the 1D virtual marker 201 can define a path of travel by the user with the electronic device.

In an embodiment, the processor (e.g., the processor 120 of FIG. 1) of the electronic device 101 may determine the radius of a specific space in which the 1D virtual marker 201 is generated by using the data collected in the specific place. In this specification, the radius may mean a region, may be a term used interchangeably with a region, and may not be limited to a circular shape. The processor 120 may collect sensing values within the radius of a specific space, using the sensor module 176, as the electronic device 101 moves within the radius of a specific space and may simultaneously receive the first wireless communication signal 240 and/or the second wireless communication signal 250, using the wireless communication module 192.

In an embodiment, to spatially match the sensing values with the specified space, the processor 120 of the electronic device 101 may perform image processing in a camera (e.g., the camera 180 in FIG. 1) that supports Augmented Reality (AR) technology, and may estimate a relative location. That is, as the user moves, the camera captures a picture of a surrounding area. The picture of the surrounding area can be determine points along the path of the 1D virtual marker 201.

In an embodiment, the 1D virtual marker 201 may be generated using the sensing values 210, 220, and 230, and the wireless communication signal values 240 and 250, but may not be limited thereto. The shape of the virtual marker may become a 1D line, a two-dimensional (2D) plane, or a three-dimensional (3D) space.

In an embodiment, the 1D virtual marker 201 may include the sensing values changed while the electronic device 101 is moving, the speed of the electronic device 101, and/or movement information of the electronic device such as the orientation of the electronic device 101. The 1D virtual marker 201 may include features of a specified space. When the electronic device 101 generates the 1D virtual marker 201 indoors, the 1D virtual marker 201 may reflect features associated with the shape of the indoor structure and/or physical features of objects arranged indoors. For example, the 1D virtual marker 201 may reflect the shapes of structures such as steel frames, stairs, and/or walls indoors. For another example, the 1D virtual marker 201 may reflect material features of objects such as furniture arranged indoors.

In an embodiment, the 1D virtual marker 201 may store magnetic field information reflecting indoor structure information. For example, the processor can estimate the characteristics of the material surrounding or adjacent to the electronic device. The processor can measure affection or distortion in the magnetic field caused by the particular feature of the material in the indoor structure (a concrete, a steel skeleton structure of a building). The 1D virtual marker 201 may store the acceleration value and/or rotational motion information of the electronic device 101. The 1D virtual marker 201 may store peripheral wireless signal information in connection with optimizing the power consumption of the electronic device 101. For example, the 1D virtual marker 201 may store Wi-Fi signal information and/or cellular signal information. The time value from the first time (Timestamp 1) to the N-th time (Timestamp N) in the 1D virtual marker 201 may be stored as a time value set to measure the sensing values 210, 220, 230, 240, and 250, such as magnetic field information, at a specified period.

In an embodiment, although not illustrated, the 1D virtual marker 201 may include a latitude value and a longitude value of the electronic device 101. The latitude value and longitude value of the electronic device 101 may be measured from the first time (Timestamp 1) to the N-th time (Timestamp N), using a global positioning system (GPS) included in the sensor module 176 and/or the wireless communication module 192. The latitude value may include the first latitude value Lat1 measured at the first time (Timestamp 1) and the N-th latitude value LatN measured at the N-th time (Timestamp N). The longitude value may further include the first longitude value Lon1 measured at the first time (Timestamp 1) and the N-th longitude value LonN measured at the N-th time (Timestamp N).

Figure 3:
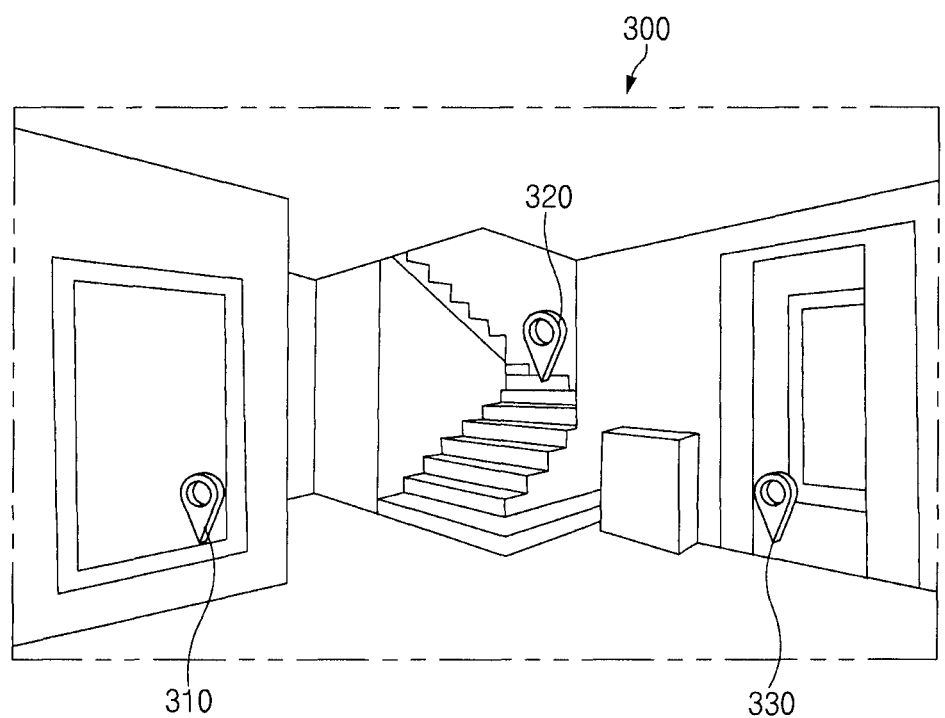
FIG. 3 is a diagram illustrating a method of setting virtual markers at a specific location according to an embodiment.

FIG. 3 is a diagram 300 illustrating a method of setting virtual markers 310, 320, and 330 at a specific location according to an embodiment. The virtual markers 310, 320, and 330 can be associated with a location, and have a set of sensing values 210, 220, 230, 240, 250, associated therewith.

In an embodiment, the virtual marker 310, 320, and 330 may be data corresponding to specific places. For example, the virtual markers 310, 320, and 330 may be data corresponding to a small region, a detailed location, and/or a short path among specific places. The virtual markers 310, 320, and 330 may be stored in a memory (e.g., the memory 130 of FIG. 1) of an electronic device (e.g., the electronic device 101 of FIG. 1). The virtual markers 310, 320, and 330 may include a magnetic sensing value (e.g., the magnetic sensing value 210 in FIG. 2) an acceleration sensing value (e.g., the acceleration sensing value 220 in FIG. 2), a gyro sensing value (e.g., the gyro sensing value 230 in FIG. 2), a first wireless communication signal (e.g., the first wireless communication signal 240 of FIG. 2), and/or a second wireless communication signal (e.g., the second wireless communication signal 250 of FIG. 2), in a small region, a detailed location, and/or a short path.

In an embodiment, the magnetic sensing value 210, the first wireless communication signal 240, and/or the second wireless communication signal 250 at a small region, a detailed location, and/or a short path included in the virtual markers 310, 320, and 330 may vary depending on the indoor structure. For example, the magnetic sensing value 210, the first wireless communication signal 240, and/or the second wireless communication signal 250 may vary depending on the frame of the building and/or the material of the structure. For another example, the magnetic sensing value 210, the first wireless communication signal 240, and/or the second wireless communication signal 250 may vary depending on the shape and/or material of an object arranged indoors.

In an embodiment, when the virtual markers 310, 320, and 330 correspond to the short path, the short path may be a path having a length of about 30 cm or more and about 70 cm or less. The virtual markers 310, 320, and 330 may be data corresponding to a specific indoor place and/or an object arranged indoors. The virtual markers 310, 320, and 330 may include the first virtual marker 310, the second virtual marker 320, and/or the third virtual marker 330, which is data corresponding to a specific indoor place and/or an object arranged indoors. For example, the user may define the first virtual marker 310 as "the front of a mirror". For another example, the user may define the second virtual marker 320 as "the front of a door". For still another example, the user may define the third virtual marker 330 as "the space above a stair".

Figure 4:
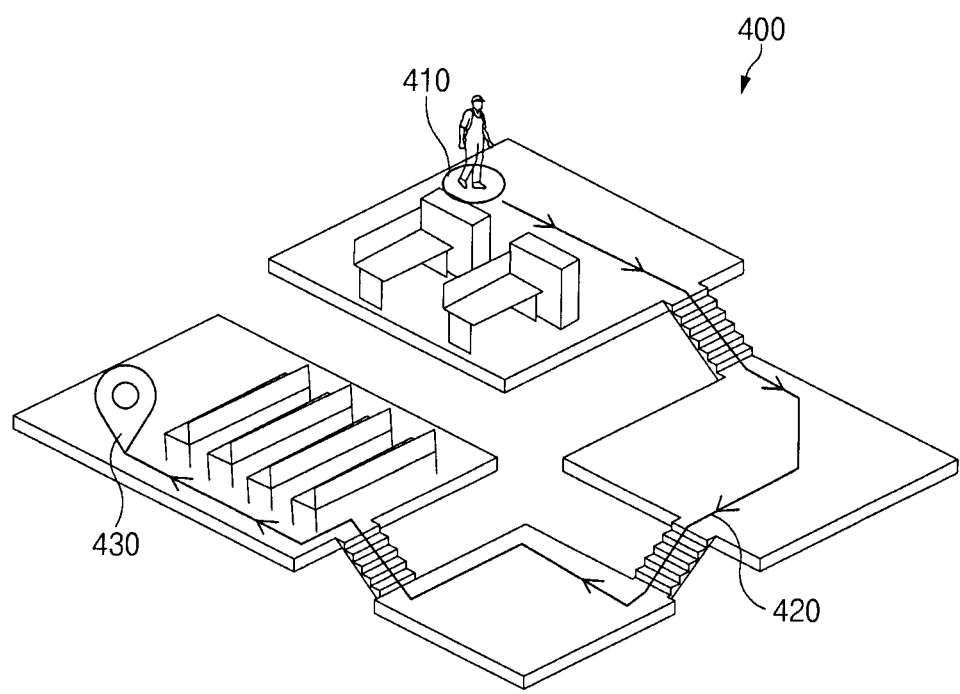
FIG. 4 is a diagram illustrating a method of setting virtual markers in a specific path according to an embodiment.

FIG. 4 is a diagram 400 illustrating a method of setting virtual markers 410, 420, and 430 in a specific path according to an embodiment. The virtual markers can include readings of the 1D virtual mark 201 as the user moves from the locations associated with virtual marker 410, to the location associated with virtual marker 420, to the location associated with virtual marker 430.

In an embodiment, the virtual marker 410, 420, and 430 may be data corresponding to specific places. For example, the virtual markers 410, 420, and 430 may be data corresponding to a long path among the specific places. The virtual markers 410, 420, and 430 may be stored in a memory (e.g., the memory 130 of FIG. 1) of an electronic device (e.g., the electronic device 101 of FIG. 1). The virtual markers 410, 420, and 430 may include a magnetic sensing value (e.g., the magnetic sensing value 210 in FIG. 2), an acceleration sensing value (e.g., the acceleration sensing value 220 in FIG. 2), a gyro sensing value (e.g., the gyro sensing value 230 in FIG. 2), a first wireless communication signal (e.g., the first wireless communication signal 240 of FIG. 2), and/or a second wireless communication signal (e.g., the second wireless communication signal 250 of FIG. 2) at a long path.

In an embodiment, the magnetic sensing value 210, the acceleration sensing value 220, the gyro sensing value 230, the first wireless communication signal 240, and/or the second wireless communication signal 250 in the long path included in the virtual markers 410, 420, and 430 may vary depending on indoor structures. For example, the magnetic sensing value 210, the first wireless communication signal 240, and/or the second wireless communication signal 250 may vary depending on the shape of a path and/or the structure around the path. For another example, the acceleration sensing value 220 and/or the gyro sensing value 230 may vary depending on a speed at which the electronic device 101 is moving on a path, and/or a direction in which the electronic device 101 faces when being moving on the path.

In an embodiment, when the virtual markers 410, 420, and 430 correspond to the long path, the long path may be a path having a length of anywhere from about 5 m to about 100 m. The virtual marker 410 may be data corresponding to a specific indoor moving path. For example, the virtual markers 410, 420, and 430 may be data corresponding to a moving path that starts at the first point 410, passes through the second point 420, and reaches the third point 430. The user may define the virtual markers 410, 420, and 430 as data indicating a successive progression path, such as a moving path that starts at the first point 410, passes through the second point 420, and reaches the third point 430.

Figure 5:
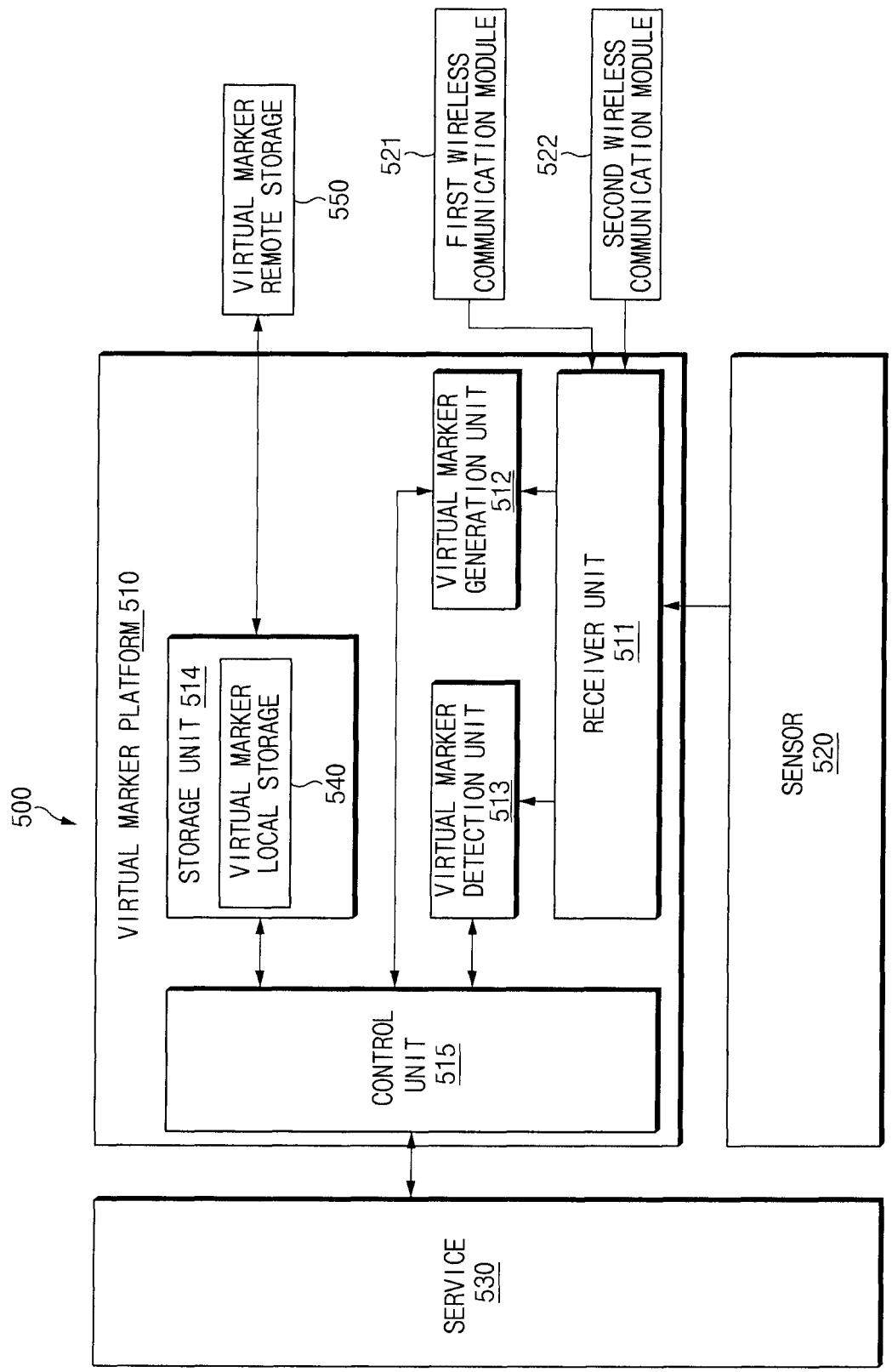
FIG. 5 is a block diagram illustrating a virtual marker platform according to an embodiment.

FIG. 5 is a block diagram 500 illustrating a virtual marker platform 510 according to an embodiment. The virtual marker platform 510 may be software stored in a memory (e.g., the memory 130 of FIG. 1). The virtual marker platform 510 may include one or more instructions. A processor (e.g., the processor 120 of FIG. 1) may load and execute the virtual marker platform 510 from the memory 130. The term "processor" shall be understood to include both the singular and plural contexts. The virtual marker platform 510 according to an embodiment may include a receiver unit 511, a virtual marker generation unit 512, a virtual marker detection unit 513, a storage unit 514, and a control unit 515. The sensor 520 can include an accelerometer, and gyroscope, among others. The receiver unit 511 can detect readings from the sensor 520, and measurements of the first wireless communication signals and second wireless communication signals. The virtual marker generation unit 512 and/or virtual marker detection unit 513 can be used to generate the 1D virtual mark 201 from the receiver unit 511.

In an embodiment, the receiver unit 511 may receive sensing data from a sensor 520. The sensing data may include a magnetic signal (such as magnetic sensing values 210), the movement of the electronic device (e.g., the electronic device 101 in FIG. 1), the acceleration of the electronic device 101 (such as acceleration sensing value 220), and/or the angular orientation of the electronic device 101 to the ground (such as gyro sensing value 230).

In an embodiment, the receiver unit 511 may receive first wireless communication data from a first wireless communication module 521, and may receive second wireless communication data from a second wireless communication module 522. The first wireless communication data may include a wireless LAN signal (e.g., the first wireless communication signal 240 of FIG. 2) and related parameters. The second wireless communication data may include a cellular signal (e.g., the second wireless communication signal 250 of FIG. 2) and related parameters.

In an embodiment, the receiver unit 511 may collect sensing data and then may provide the collected sensing data to the virtual marker generation unit 512 and/or the virtual marker detection unit 513. The receiver unit 511 may collect data from the sensor 520 including a magnetic field sensor, accelerometer, and/or gyroscope.

In an embodiment, the receiver unit 511 may calibrate the sensing data, using the motion information of the electronic device 101 so as to be used to generate and/or detect a virtual marker (e.g., the 1D virtual marker 201 in FIG. 2). To provide information necessary to generate and/or detect the virtual marker 201 and/or efficient information, the receiver unit 511 may generate information such as the orientation and/or posture of the electronic device 101 from the collected sensing data to provide the generated information to the virtual marker generation unit 512 and/or the virtual marker detection unit 513.

In an embodiment, the virtual marker generation unit 512 may generate the first virtual marker 201 corresponding to a first location, the current location of the electronic device 101, using the sensing data. The virtual marker generation unit 512 may receive a request to generate the virtual marker 201 from the control unit 515. The virtual marker generation unit 512 may generate the first virtual marker in a specified format, based on magnetic field information, movement information of the electronic device 101, and/or sensing data such as an image of a camera 180 supporting AR, which is received from the receiver unit 511. The virtual marker generation unit 512 may generate the first virtual marker in the specified format based on the first wireless communication data and the second wireless communication data received from the receiver unit 511. The virtual marker generation unit 512 may request the control unit 515 to register the generated virtual marker 201.

The virtual marker detection unit 513 may detect any virtual marker. The virtual marker detection unit 513 may detect one or more of the 1D virtual marker 201 corresponding to the virtual marker requested from the control unit 515.

When the virtual marker 201 requested from the control unit 515 is detected, the virtual marker detection unit 513 may transmit the result related to the detected virtual marker 201 to the control unit 515.

In an embodiment, the storage unit 514 may store the first virtual marker 201. The storage unit 514 may include virtual marker local storage 540. The virtual marker local storage 540 may be a partly-physical area or partly-logical area in the memory 130. For example, the virtual marker local storage 540 may be a partial area of the physically-allocated memory or may be defined as a logical memory address value. The virtual marker remote storage 550 may be a server (e.g., the server 103 of FIG. 1) outside the electronic device 101.

In an embodiment, the control unit 515 may register the virtual marker 201 by requesting the virtual marker local storage 540 and/or virtual marker remote storage 550 to register a virtual marker. The control unit 515 may transmit a request to load a virtual marker list and/or virtual marker stored in the virtual marker local storage 540 and the virtual marker remote storage 550 to load the stored virtual marker list and/or stored virtual marker.

In an embodiment, the control unit 515 may register a first virtual marker, may detect an arbitrary virtual marker, and may load the first virtual marker from the storage unit 514. The control unit 515 may control signals and/or pieces of information transmitted and received inside the virtual marker platform 510.

In an embodiment, the service 530 may be a function associated with the detection of the virtual marker 201 in the electronic device 101. The service 530 may be an application (e.g., the application 146 of FIG. 1) executed at a location where the virtual marker 510 is detected, or may be a function (or operation) provided by the application 146. For example, the service 530 may be a health app configured to be executed at the entrance of a gym where the electronic device 101 detects the virtual marker 510. The service 530 may be a notification indicating an event occurring at a location where the virtual marker is detected. For example, the service 530 may provide a notification that the electronic device 101 has entered a mart entrance, through a push notification. The service 530 may be a function to change the operation of the application 146 or to perform authentication as the virtual marker is detected. For example, the service 530 may display a guide that allows a user to change a payment app to a payment ready state when the electronic device 101 enters a checkout counter and to perform authentication.

In an embodiment, the control unit 515 may provide the service 530 mapped onto a location where the virtual marker is detected. For example, when detecting that the electronic device 101 has entered a location where the virtual marker is generated, the control unit 515 may execute the service 530. For another example, when detecting that the electronic device 101 has entered a location where the virtual marker is generated, the control unit 515 may transmit a control signal for requesting the service 530 to execute a specified event.

In an embodiment, the virtual marker platform 510 may not include at least one of the components shown in FIG. 5, may include other components not shown, or may include a component in which a plurality of components are merged. For example, the storage unit 514 may be a component separate from the virtual marker platform 510.

According to an embodiment, when it is detected that the electronic device 101 has entered a first location, the electronic device 101 may execute a specified event or may request a specified service.

In an embodiment, when a request is received by the service 530, the control unit 515 may request a notification indicating that the electronic device 101 has entered the first location. For example, a specific service such as a notification in a reminder application and/or a specific operation in a Bixby routine may be performed. When the electronic device 101 enters the corresponding place, the service 530 may request the electronic device 101 to perform a specified operation. The notification event according to the entrance of the first location may be executed such as the reminder and/or Bixby routine.

In an embodiment, a specific location in a vehicle such as the front of a car audio system may be registered as a virtual marker. When the electronic device 101 is located at a location where the virtual marker is registered, a specific application such as a navigation or music application may be executed.

In an embodiment, when a request is received by the service 530 such that a specific space is recognized by the virtual marker, the control unit 515 may request the receiver unit 511 upon generating the virtual marker to maximally collect information about a location where the electronic device 101 is capable of passing by while moving. When the control unit 515 requests the service 530 to recognize a specific space in a process of detecting a virtual marker, the control unit 515 may request the virtual marker detection unit 513 to detect whether the electronic device 101 passed through a specific space while moving.

In an embodiment, when a request is transmitted such that a specific object is recognized by the virtual marker, the control unit 515 may request the receiver unit 511 to collect information in a form surrounding a specific object upon generating a virtual marker. When requesting the service 530 to recognize a specific object in the process of detecting the virtual marker 810, the control unit 515 may request the virtual marker detection unit 513 to detect an intentional action that a user touches the electronic device 101 at a periphery of the specific object.

In an embodiment, various services 530 such as advertisements in a mart may be implemented using the virtual marker platform 510. For example, the front of a specific product display in a mart may be registered as a virtual marker. When any electronic device enters a location where the virtual marker is registered, the service 530 may inform a user of the electronic device of information about products or related marketing information.

Figure 6:
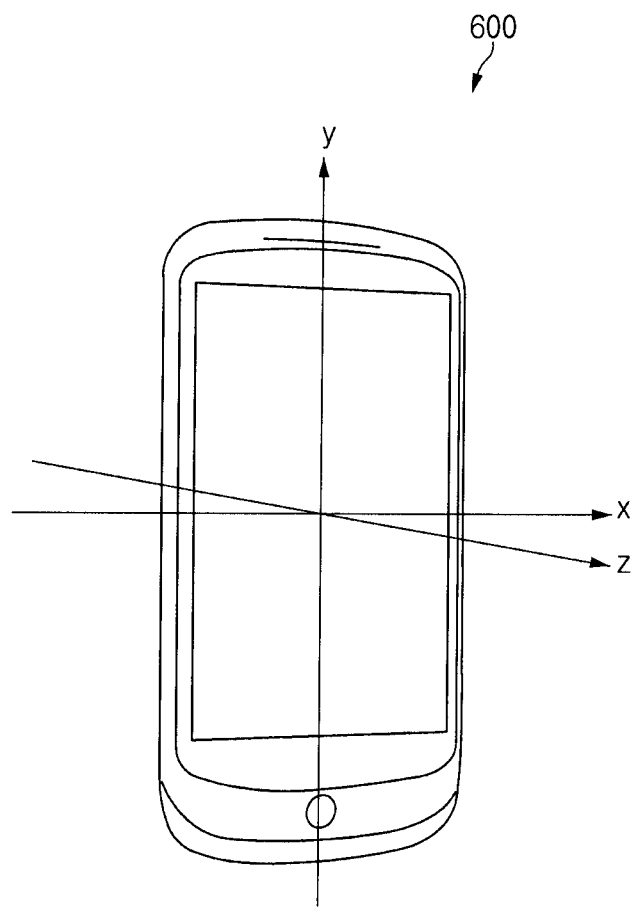
FIG. 6 is a diagram illustrating coordinates for specifying a location and/or direction of an electronic device according to an embodiment.

FIG. 6 is a diagram illustrating coordinates (x, y, z) for specifying a location and/or direction of an electronic device (e.g., the electronic device 101 of FIG. 1) according to an embodiment. The coordinates (x, y, z) according to an embodiment may include a first coordinate value (x), a second coordinate value (y), and a third coordinate value (z). The first coordinate value (x) may be a coordinate value in the width direction (the narrower dimension of the display) of an electronic device. The second coordinate value (y) may be a coordinate value in the length direction (the longer dimension of the display) of the electronic device. The third coordinate value (z) may be a coordinate value in the thickness and/or height direction (an axis orthogonal to the display) of the electronic device.

In an embodiment, a 1D virtual marker (e.g., the 1D virtual marker 201 of FIG. 2) may be defined as moving path data on a specified path. Although not illustrated in the drawing, the virtual marker 201 may additionally include a latitude value and/or longitude value corresponding to a time stamp. The moving path data may include a latitude value and/or longitude value of the electronic device 101. The latitude and/or longitude of the electronic device 101 may be measured by a global positioning system (GPS) included in the sensing module 176 of the electronic device 101 and/or the wireless communication module 192. The processor (e.g., the processor 120 of FIG. 1) of the electronic device 101 may determine whether the electronic device 101 is located in a close proximity to a specific indoor place, based on a latitude value and/or longitude value.

In an embodiment, the processor 120 of the electronic device 101 may determine coordinates (x, y, z) for specifying the location and/or direction of the electronic device 101, based on the first coordinate value (x) in the width direction of the electronic device 101, the second coordinate value (y) in the length direction, and the third coordinate value (z) in the thickness and/or height direction. The moving path data may include a magnetic field vector value measured based on the coordinates (x, y, z). The moving path data may include an acceleration vector value and/or angular acceleration vector value measured based on the coordinates (x, y, z) for specifying the location and/or direction of the electronic device 101. The moving path data may include air pressure and/or altitude values measured based on the coordinates (x, y, z) for specifying the location of the electronic device 101.

In an embodiment, the moving path data may include parameter values for cellular signals measured and/or received based on the coordinates (x, y, z) for specifying the location and/or direction of the electronic device 101. The moving path data may include parameter values for wireless LAN signals measured and/or received based on the coordinates (x, y, z) for specifying the location and/or direction of the electronic device 101. The moving path data may include parameter values for Bluetooth signals measured and/or received based on the coordinates (x, y, z) for specifying the location and/or direction of the electronic device 101.

Figure 7:
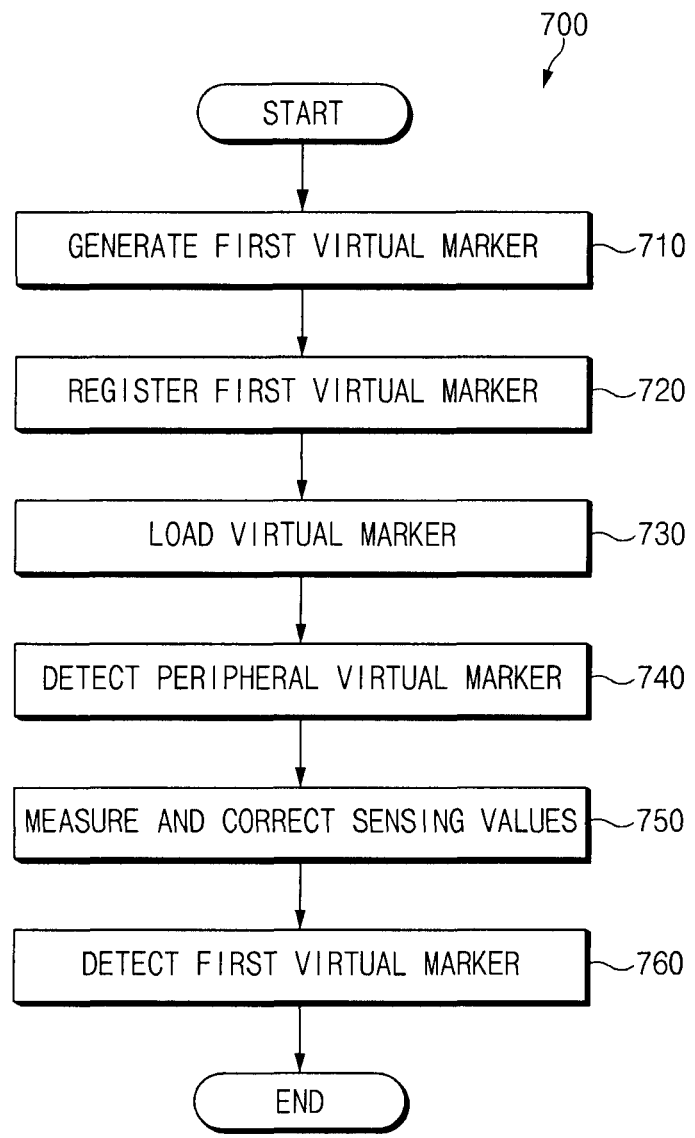
FIG. 7 is a flowchart illustrating an operation of generating and/or detecting a virtual marker according to an embodiment.

FIG. 7 is a flowchart 700 illustrating an operation of generating and/or detecting a virtual marker 201 according to an embodiment.

In an embodiment, the processor 120 of an electronic device (e.g., the electronic device 101 of FIG. 1) may perform an operation 710 of generating a virtual marker. The processor 120 may generate a first virtual marker (e.g., the virtual marker 201 of FIG. 2) corresponding to a first location, the current location of the electronic device 101, using wireless signals received by the electronic device 101, and sensing data including a magnetic signal, movement of the electronic device 101, the acceleration of the electronic device 101, and/or the angular orientation of the electronic device 101 to the ground.

In an embodiment, the processor 120 may determine the radius of a specific space to be generated upon generating the virtual marker 201. The processor 120 may collect the sensing values (e.g., the sensing values 210, 220, 230, 240, and 250 in FIG. 2) within the radius through the movement of the electronic device 101 within the corresponding radius, using the sensor module 176. For spatial matching between the determined space and the measured sensing values 210, 220, 230, 240, and 250, the processor 120 may process the image obtained, using a camera supporting AR technology (e.g., the camera module 180 of FIG. 1) to estimate a first location that is the current location of the electronic device 101. The electronic device 101 may identify features in the image obtained using the camera 180. That is, upon generating a virtual marker, the processor 120 of the electronic device 101 may measure a sensing value and may recognize a feature point (e.g., specific places (the front of the mirror 310, the front of the door 320, and the stair 330 in FIG. 3, the pattern of a floor, the location and shape of the arranged furniture, the curvature of a wall, or the like) in an image through the camera 180 at the same time. The processor 120 may perform a process of specifying an arbitrary reference point on the image obtained by the camera 180. The processor 120 may estimate how far the electronic device 101 has moved around the reference point, using for example, either GPS or accelerometer/gyroscope readings. The processor 120 may estimate a moving path (e.g., a moving path that starts from the starting point 410 of FIG. 4, passes through the path 420 inside the building, and reaches the destination point 430) on which the electronic device 101 has moved from one point to another indoors. The processor 120 may periodically measure the degree of movement. The processor 120 may arrange sensing values associated with the measured degree of movement in a space.

In an embodiment, the processor 120 of the electronic device 101 may perform an operation 720 of registering a virtual marker. The processor 120 may store a first virtual marker in a memory (e.g., the memory 130 in FIG. 1). The first virtual marker stored in the memory 130 may be registered in a virtual marker list in the memory 130.

In an embodiment, the processor 120 of the electronic device 101 may perform an operation 730 of loading the virtual marker. After generating the virtual marker 201, the processor 120 may store the virtual marker 201 in the memory 130 and may register the virtual marker 201 in the virtual marker list. The processor 120 may load the virtual marker 201 to detect the registered virtual marker 201. For example, when an application (e.g., the application 146 in FIG. 1) that executes an event corresponding to the virtual marker 201 registered in the electronic device 101 is executed, the processor 120 may load the virtual marker 201. For another example, when identifying that the electronic device 101 has entered the location corresponding to the registered virtual marker 201 within a specific radius, the processor 120 may load the virtual marker 201. For another example, when the processor 120 receives a notification associated with a service related to a location where the virtual marker 201 is registered (for example, an access point for a particular location), the processor 120 may load a virtual marker to be detected among virtual markers registered in the virtual marker list from the memory 130.

In an embodiment, the processor 120 of the electronic device 101 may perform an operation 740 of detecting a peripheral virtual marker. After registering the virtual marker to be detected, the processor 120 may determine whether to enter the first location within a specific radius, to determine whether to enter the first location.

In an embodiment, to determine whether to enter an area within a specific radius from the virtual marker 201, the processor 120 may use wireless communication such as a cellular signal and/or a Wi-Fi signal, which may receive at all times and does not consume power separately for transmission and reception. The processor 120 may detect whether to enter an area within a specific radius from the first location from a relatively wide radius using the wireless communication circuit 192. When identifying that the electronic device 101 has entered an area within a specific radius from the first location, the processor 120 may operate at least part of sensors of the sensor module 176 used to generate the virtual marker 201. For example, when the electronic device 101 enters an area within a specific radius from the first location, the processor 120 may operate sensors necessary to detect the first virtual marker among the sensors of the sensor module 176.

In an embodiment, the processor 120 of the electronic device 101 may perform an operation 750 of processing a sensing value. The processor 120 may measure the sensing values 210, 220, 230, 240, and 250 within a specific radius, using the sensor module 176.

In an embodiment, the processor 120 may calibrate errors in the sensing values 210, 220, 230, 240, and 250 caused by the movement of the electronic device 101. To calibrate the error in the sensing values 210, 220, 230, 240, and 250 changed due to the movement of the electronic device, the processor 120 may sort and compare information included upon generating the virtual marker 201 with information measured upon detecting the virtual marker 201.

In an embodiment, the processor 120 of the electronic device 101 may perform an operation 760 of detecting the virtual marker. The processor 120 may determine whether to enter the first location, by comparing the measured sensing values with sensing data of the first virtual marker. The processor 120 may compare the sensing values 210, 220, 230, 240, and 250 calibrated after being measured in real time with the sensing data of the registered virtual marker 201; when the sensing values 210, 220, 230, 240, and 250 are match with the sensing data, the processor 120 may provide a specified service. For example, when the sensing data calibrated after being measured in real time and wireless signal data are matched with the first virtual marker, the processor 120 may be configured to execute an event specified to be performed by the electronic device 101 at a first location, or to request a specified service.

In an embodiment, the operations 710 to 760 may occur continuously or stepwise or may not be performed. For example, the operations 710 to 720 of generating and registering the virtual marker 201 may be performed separately from the operation 740 of the detection operation.

In an embodiment, the contents described with reference to FIGS. 1 to 8 may be applied for the operation of determining whether to enter a corresponding location by comparing the calibrated sensing value of operation 760 with the virtual marker 201.

Figure 8A:
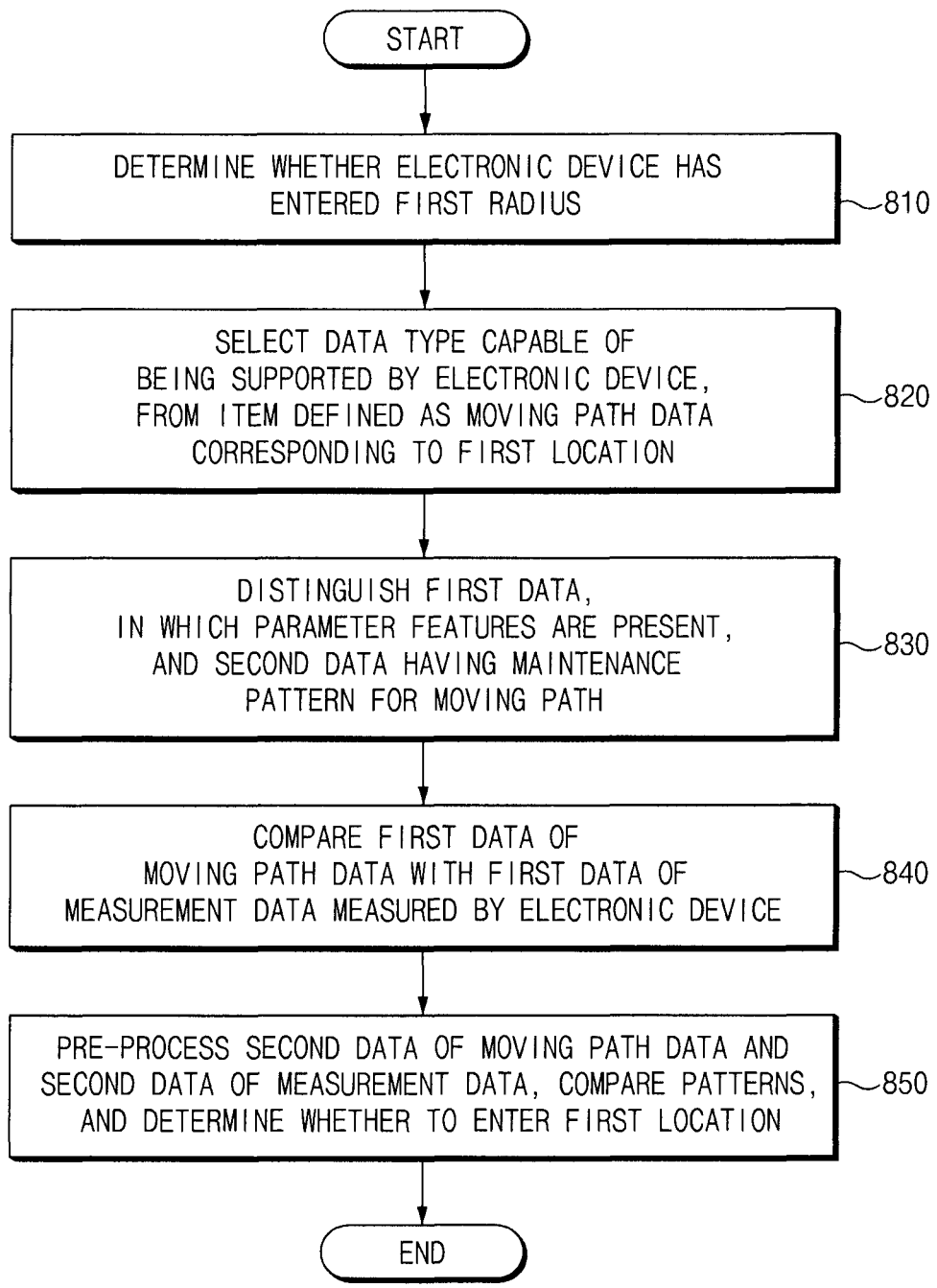
FIG. 8A is a flowchart illustrating a method in which an electronic device detects a location based on moving path data, according to an embodiment.

FIG. 8A is a flowchart 800 illustrating a method in which an electronic device (e.g., the electronic device 101 of FIG. 1) detects a location based on moving path data (e.g., the 1D virtual marker 201 of FIG. 2), according to an embodiment.

In operation 810, the processor 120 of the electronic device 101 according to an embodiment may determine whether the electronic device 101 has entered the first radius, that may be a region including a specific place that is at least along a path defined by moving path data. To determine whether there is entry to the specific place, the processor 120 may first determine whether the electronic device 101 has entered within the first radius of the specific place.

According to an embodiment, in operation 810, the processor 120 of the electronic device 101 may determine whether the electronic device 101 has entered an area within a first radius, which is a specific radius around a first location that is a specific location defined by at least part of the moving path data. For example, the processor 120 may first determine whether the electronic device 101 has entered an area within a distance of about 20 m or more and about 100 m or less from the first location. The determination of whether the electronic device 101 has entered the area within the distance, e.g., 20 m, 100 m, from the first location can be determined by the cellular signals and wireless LAN signals received by the communication circuit or by GPS.

In an embodiment, the electronic device 101 may receive a cellular signal and/or a wireless LAN signal, using a communication circuit (e.g., the wireless communication module 192 of FIG. 1) or may receive a GPS signal using a global positioning system (GPS). The processor 120 may obtain information about a cellular base station and/or wireless LAN base station, using a cellular signal and/or wireless LAN signal, or may obtain location information of the electronic device 101, using a GPS signal. The processor 120 may determine the location of the electronic device 101, based on information about the cellular base station and/or wireless LAN base station or based on the location information of the electronic device 101 using GPS signal. The processor 120 may determine whether the electronic device 101 has entered the first radius. For example, the electronic device 101 can determine its distance from an Access Point from the strength of the signal received from the Access Point.

In operation 820, the processor 120 of the electronic device 101 may select a signal type capable of being supported by the electronic device 101, from an item defined as moving path data that corresponds to the first location. When the electronic device 101 enters the first radius, the processor 120 may perform operation 820. The electronic device 101 may store a specific path and/or specific region in the memory 130 as a first location at which moving path data is generated, based on the moving path data (e.g., the 1D virtual marker in FIG. 2) stored in a memory (e.g., the memory 130 of FIG. 1). As described with reference to FIGS. 2 to 7, the first location may be a 1D, 2D, and/or 3D path and/or region. The processor 120 may generate a virtual marker (e.g., the virtual marker 201 of FIG. 2) at the first location and may store the virtual marker in the memory 130. In the case where the electronic device 101 stores the first location and then approaches the first location, the virtual marker 201 may be an example of path data capable of detecting the case.

In an embodiment, the item defined by at least part of the moving path data (e.g., the virtual marker 201 in FIG. 2) may include items stored in the memory 130 by classifying data (e.g., the magnetic sensing value 210, the acceleration sensing value 220, the gyro sensing value 230, the first wireless communication signal 240, and/or the second wireless communication signal 250 in FIG. 2) associated with the moving path data for each type. The virtual marker 201 may store a reliability value for the moving path data together. The item defined as moving path data may include a signal type list obtained by summarizing whether the electronic device 101 supports the corresponding module. The signal type list may be a table in which types (e.g., a magnetometer, Bluetooth, or the like) of devices and/or modules capable of being supported in the sensor module 176 supporting obtaining the moving path data are listed or summarized. The processor 120 may select at least one data capable of being obtained by the electronic device 101 using the sensor module 176, from the signal type list.

In an embodiment, the processor 120 of the electronic device 101 may select data having a moving path discrimination that is not less than a specified threshold value, from the signal type list of items defined as moving path data. The moving path discrimination may be a criterion for determining whether to support and/or suitability for the corresponding signal type (e.g., a Bluetooth signal, wireless LAN signal, cellular signal, or geomagnetic signal). For example, in the case of a cellular, wireless LAN, or Bluetooth signal, the moving path discrimination may be set based on the strength of the received signal (e.g., based on whether the strength of the received signal is not less than the threshold value). The processor 120 may not utilize a signal type with less moving path discrimination (e.g., signal strength is not greater than the threshold value) for the moving path data.

For another example, the processor 120 may distinguish a case including and not including the sensor module 176 required to define the moving path data, by analyzing the various sensor modules 176 included in the electronic device 101. The processor 120 may set the moving path discrimination based on whether the corresponding sensor module is included. The moving path discrimination may be reliability capable of detecting the location and/or direction of the electronic device 101 and determining whether the electronic device 101 has entered the first location. The moving path discrimination may be determined using data stored together with the virtual marker 201 in the form of a table in the memory 130 of the electronic device 101. The moving path discrimination may be defined as a separate instruction in the memory 130 of the electronic device 101, and the instruction may be determined by the processor 120.

In an embodiment, the processor 120 may set a data bit mask flag for data having the moving path discrimination, which is not less than a specified threshold value, to 1, and may set a data bit mask flag for data having the moving path discrimination, which is less than the specified threshold value, to 0. For example, when the overall Bluetooth signal is very weak and the discrimination as the moving path data is insufficient, the processor 120 may set the data bit mask flag for a Bluetooth resource to 0. The processor 120 may efficiently set the number of resources to be measured in an operation of determining whether to enter and/or advance to a specific indoor place, through setting a data bit mask flag.

In an embodiment, the processor 120 of the electronic device 101 may set a resource bit mask flag for a resource capable of being supported by the electronic device 101. For example, when the sensor module 176 has a barometric pressure sensor and/or altitude sensor, the processor 120 may set a bit mask of the barometric pressure sensor and/or a bit mask of the altitude sensor to 1. When not having the barometric pressure sensor and/or altitude sensor, the processor 120 may set the bit mask of the barometric pressure sensor and/or the bit mask of the altitude sensor to 0.

In an embodiment, when it is determined that a user is close to the first location that is a specific indoor place, the processor 120 of the electronic device 101 may perform an AND operation by using a data bit mask flag and a resource bit mask flag as inputs. The processor 120 may determine a resource necessary to generate measurement data based on the result of an AND operation of the data bit mask flag and the resource bit mask flag. The processor 120 may generate the measurement data by measuring data or receiving a signal from the determined resources.

In operation 830, the processor 120 of the electronic device 101 according to an embodiment may distinguish first data, in which parameter features are present, and second data having a maintenance pattern for a moving path. The maintenance pattern may be a pattern in which a constant shape and/or magnitude value is maintained at the place where the electronic device 101 is located even as time goes by. A signal bias may occur as time goes by, or a bias change according to the temperature difference of the electronic device 101 may occur. However, the pattern of the signal may be maintained other than the bias. The maintenance pattern may have a pattern for defining or specifying the corresponding place. The data included in the signal type list of items defined as moving path data may be classified into first data and second data.

In an embodiment, the measurement data obtained from resources determined based on the result of the AND operation of the data bit mask flag and the resource bit mask flag may also be classified into the first data and the second data. The first data may be defined as parameter data. The first data may be data with feature points in a pattern type according to a place. The second data may be defined as maintenance pattern data. The second data may be data having a maintenance pattern having feature points of the pattern type according to a moving path. The first data and the second data may be stored in the memory 130. The first data may include cellular parameters such as a cellular signal, Serving cell ID, neighbor cell ID, Timing Advanced (TA), and the like and wireless LAN parameters such as a wireless LAN signal, Basic Service Set Identifier (BSSID), SSID, frequency channels, and the like. The second data may include a magnetic field measurement value, an RSRP measurement value of the cellular signal, an RSSI measurement value of the Wireless LAN signal, and the like.

In operation 840, the processor 120 of the electronic device 101 according to an embodiment may compare first data of moving path data with first data of measurement data measured by the electronic device 101. To determine whether there is entry into an indoor specific place, the processor 120 may compare moving path data for parameter data with the measurement data.

In an embodiment, when it is determined that the parameter values of the measurement data do not reflect features of the moving path data by the specified degree or more, the processor 120 may determine that the electronic device 101 has not yet entered and/or advanced to the first location that is a specific indoor place. When the measured parameter data is different from the parameter value of the moving path data by the specified value or more, the processor 120 may not perform operation 850. When the parameter values of the measurement data are matched with the moving path data by the specified degree or more, the processor 120 may determine that the first determination of whether the first location has been entered is valid, and may perform operation 850.

According to an embodiment, in operation 850, the processor 120 of the electronic device 101 may pre-process both second data of moving path data and second data of measurement data, may compare patterns, and may determine whether the electronic device 101 has entered the first location. To compare patterns, the processor 120 may determine whether the electronic device 101 has entered the first location, by comparing a vector distance, which is a distance in a vector space and/or correlation in the vector space. The distance in the vector space may be a vector Euclidean distance that is the distance of a coordinate value between two vectors. For example, when the first vector is [0,1] and the second vector is [1,0], the vector distance between the first vector and the second vector may be $\sqrt{2}$.

When first data of moving path data corresponds to first data of measurement data, the processor 120 may perform an operation of comparing pieces of second data.

In an embodiment, to determine whether the electronic device 101 has entered and/or advanced to the first location that is a specific indoor place, the processor 120 may pre-process maintenance pattern data among measurement data. The processor 120 may perform an operation of removing the sample mean for measurement data and/or an operation of reducing fluctuations in measurement data by applying a finite impulse response (FIR) filter, as a preprocessing process for maintenance pattern data.

In an embodiment, even though the processor 120 measures data at the same sampling rate on the same moving path depending on the moving speed of the user through the preprocessing process, the processor 120 may reduce the numbers of measured data that are different from one another. For example, about 100 maintenance pattern data points may be stored in the moving path data for the same moving path with the length of about 2 m. When a user passes on the moving path at a speed faster than the speed at which the user passes upon generating the moving path data, 100 or less maintenance pattern data points may be measured as the measurement data. When the user passes on the moving path at a speed slower than the speed at which the user passes upon generating the moving path data, 100 maintenance pattern data points may be measured as measurement data. When the processor 120 measures data at the same sampling rate on the same moving path regardless of the user's moving speed, the processor 120 may perform an operation such as dynamic time warping (DTW) and/or interpolation on time series measurement data preprocessed such that the number of measured data is substantially the same.

In an embodiment, the processor 120 may determine whether there is entry and/or advance to the first location, based on the pre-processed moving path data and measurement data. The processor 120 may determine whether to enter the first location, by comparing patterns of the pre-processed moving path data and the pre-processed measurement data.

In an embodiment, the processor 120 may obtain the user's feedback on whether the electronic device 101 has entered the first location. When an incorrect determination of whether the electronic device 101 has entered the first location, based on the user's feedback, the processor 120 may modify a method of comparing patterns and/or determining whether there is entry to the first location.

In an embodiment, when providing the user with a location-based service based on the result of whether the electronic device 101 has entered and/or advanced to the first location, the processor 120 may receive a feedback from the user and may increase the accuracy of the determination of whether the electronic device 101 has entered and/or advanced to the first location. For example, when the processor 120 incorrectly determines that the user has entered the first location when the user has not entered the first location (false alarm), the processor 120 may reduce subsequent false determinations by increasing a threshold value for a pattern recognition process. For another example, when the processor 120 fails to detect an entry event even though the user has entered a specific place (missed detection), the processor 120 may reduce a missed detection probability for the first location by decreasing the threshold value for the pattern recognition process.

As described in operation 810, when the electronic device 101 is within a first radius close to the first location that is a specific indoor place, the processor 120 may perform an operation of detecting whether the electronic device 101 has entered the first location, as a method of reducing current consumption. For example, in the case where the first location that is an indoor specific place is assigned to a specific place in the user's house, only when the electronic device 101 is present in the user's house that is the base of the user (i.e., when the electronic device 101 is within the first radius), the processor 120 may perform an operation of detecting whether the electronic device 101 has entered the first location. In another example, in the case where the first location is assigned to the door of a specific store, when the electronic device 101 approaches an area within the specific radius of the corresponding store, the processor 120 may perform an operation of detecting whether the electronic device 101 has entered the first location. To this end, an operation of detecting whether the electronic device 101 has entered an area within the first radius; this may be determined as an operation in which the electronic device 101 enters/advances to a predetermined first radius. The first radius may be a region including the first location; as in the example above, the first radius may correspond to the entire house when the first location is a specific space within the house, or the first radius may be set within the specific radius region for a store when the first location is the entrance to the store.

Figure 8B:
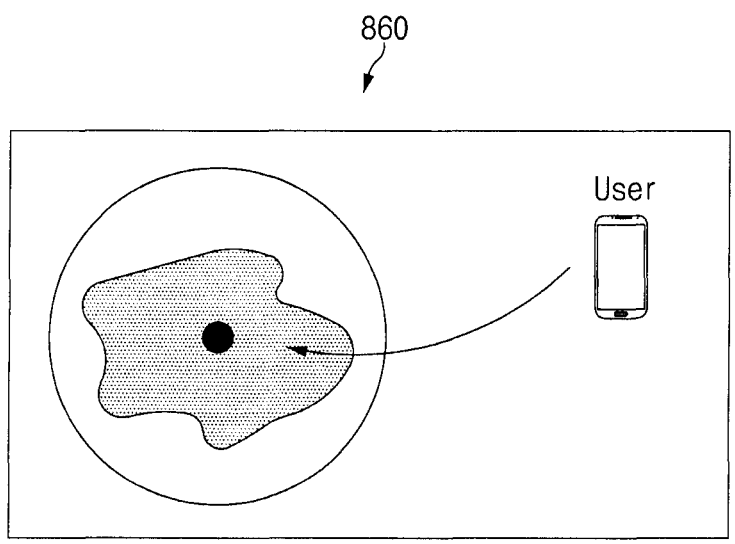
FIG. 8B is an exemplary diagram, in which an electronic device enters (or exists in) a first radius, according to an embodiment of the disclosure.
Figure 8C:
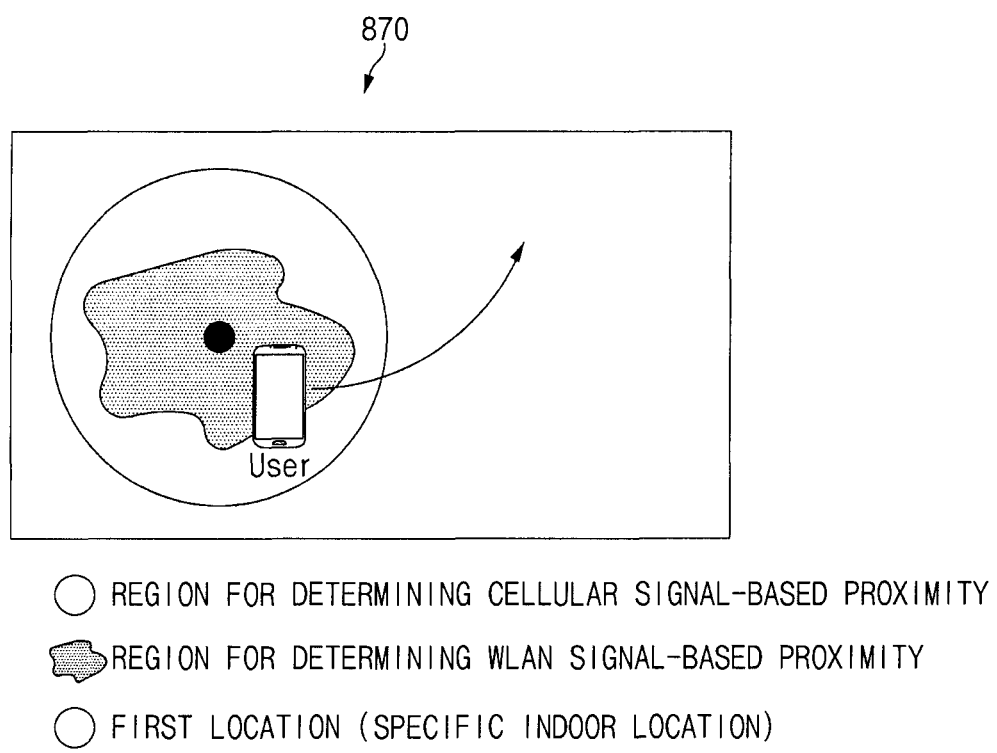
FIG. 8C is an exemplary diagram, in which an electronic device advances to (or does not exist in) a first radius, according to an embodiment of the disclosure.
Figure 8D:
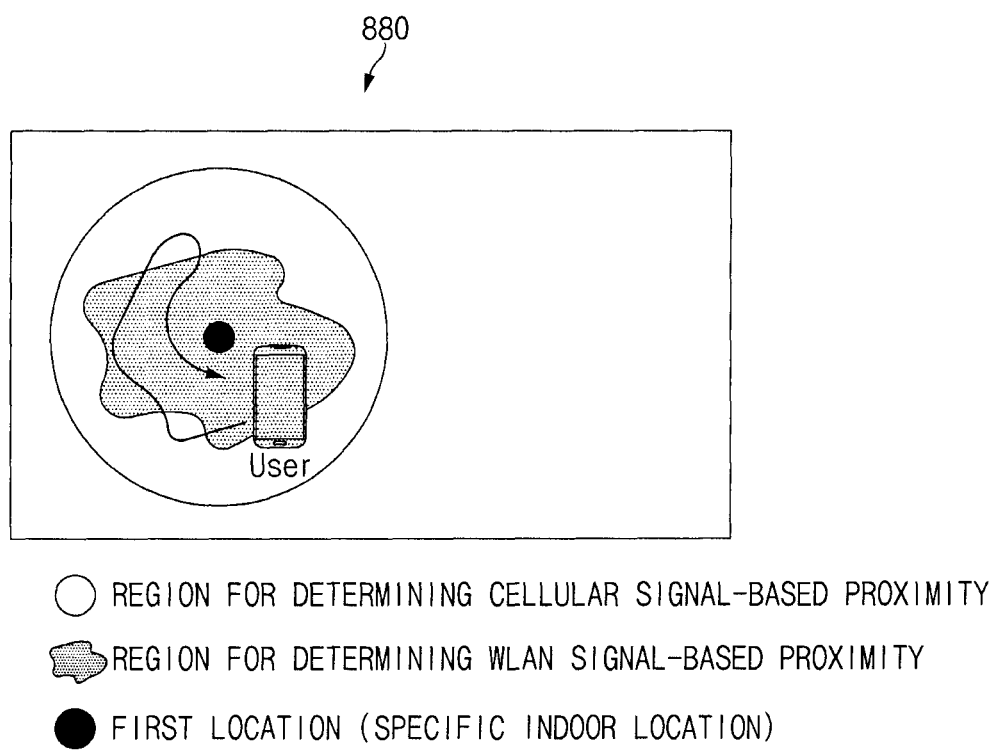
FIG. 8D is an exemplary diagram, in which an electronic device stays in the first radius, according to an embodiment of the disclosure.

FIGS. 8B to 8D are exemplary diagrams illustrating that an electronic device enters, advances to, or stays in an area within a first radius, according to an embodiment of the disclosure. FIG. 8B is an exemplary diagram 860 in which the electronic device 101 enters (or exists in) the first radius according to an embodiment of the disclosure. FIG. 8C is an exemplary diagram 870 in which the electronic device 101 advances to (or does not exist in) the first radius according to an embodiment of the disclosure. FIG. 8D is an exemplary diagram 880 in which the electronic device 101 stays in the first radius according to an embodiment of the disclosure.

Referring to FIGS. 8B to 8D, according to an embodiment of the disclosure, the wireless communication module 192 of the electronic device 101 may receive a wireless signal from at least one cellular base station and/or at least one Wireless LAN base station located around the electronic device 101. The processor 120 of the electronic device 101 may periodically monitor entry, exit or stay in/from a predetermined region based on the received wireless signal. The processor 120 may detect entry, exit, or staying, based on the cellular wireless signal for a low power operation; when entry, exit, or staying, based on the cellular wireless signal, the processor 120 may detect entry, exit, or staying within the first radius, by additionally using a wireless LAN signal.

Figure 9:
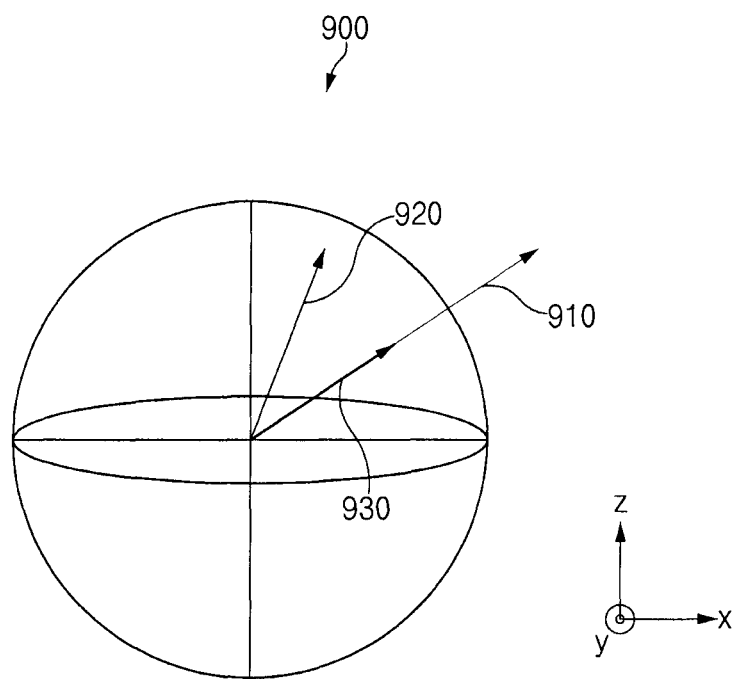
FIG. 9 is a diagram illustrating comparison of correlation between moving path data and measurement data in a vector space, according to an embodiment.

FIG. 9 is a diagram 900 illustrating comparison of correlation between moving path data and measurement data in a vector space (x, y, z), according to an embodiment. The processor (e.g., the processor 120 of FIG. 1) of the electronic device 101 may compare patterns of the pre-processed moving path data 910 and the pre-processed measurement data 920 or 930 in a vector space (x, y, z).

In an embodiment, the processor 120 may perform a mathematical correlation operation, may compare a correlation value with a predefined threshold value, and may determine whether the pre-processed moving path data 910 and the pre-processed measurement data 920 or 930 are not less than a specified correlation value.

In an embodiment, the length of the signal for the moving path data and measurement data may vary after the pre-processing of DTW is performed. For example, the number of discrete time samples may vary. Accordingly, there may be a need for a process of normalizing the correlation value to the length of the signal.

In an embodiment, to compare the patterns between the pre-processed moving path data 910 and the pre-processed measurement data 920 or 930, the processor 120 may compare distances between the pre-processed moving path data 910 and the pre-processed measurement data 920 or 930. The processor 120 may consider each of the pre-processed moving path data 910 and the pre-processed measurement data 920 or 930, as a vector of the length of N. The processor 120 may obtain a distance in a vector domain of each of the pre-processed moving path data 910 and the pre-processed measurement data 920 or 930. Various distance metrics such as Manhattan distance and Euclidean distance calculations may be used to calculate a distance in the vector domain.

In an embodiment, the pre-processed moving path data 910 may be magnetic field moving path data; the pre-processed measurement data 920 or 930 may be magnetic field measurement data. To determine whether to enter and/or advance to the first location that is a specific indoor place, the processor 120 may use the magnetic field moving path data and the magnetic field measurement data. However, the magnetic field moving path data and magnetic field measurement data are illustrated as a part of the moving path data and measurement data, and are not limited to the magnetic field moving path data and magnetic field measurement data, and may be applied to various types of the moving path data and measurement data.

In an embodiment, the vector space of the pre-processed moving path data 910 and the pre-processed measurement data 920 or 930 is not limited to the 3D vector space (x, y, z). The pre-processed moving path data 910 and the pre-processed measurement data 920 or 930 of FIG. 9 have been expressed as single points, each of which has a value on the x, y, and z axes of the single coordinates with respect to the electronic device 101. Time series data may be composed of several points, each of which has a value on the x, y, and z axes of the single coordinates with respect to the electronic device 101. For example, when the geomagnetic time series data among moving path data is expressed in a 2D array, the geomagnetic time series data is shown in Table 1 below.

TABLE 1

| $M_{X1}$ | $M_{X2}$ | $M_{X3}$ | . . . | $M_{XN}$ |
|---|---|---|---|---|
| $M_{Y1}$ | $M_{Y2}$ | $M_{Y3}$ | . . . | $M_{YN}$ |
| $M_{Z1}$ | $M_{Z2}$ | $M_{Z3}$ | . . . | $M_{ZN}$ |

Here, $M_{Xn}$ denotes the n-th X-axis geomagnetic value; $M_{Yn}$ denotes the n-th Y-axis geomagnetic value; $M_{Zn}$ denotes the n-th Z-axis geomagnetic value. Accordingly, the moving path data may be composed of the total of 3N geomagnetic values. In this case, the geomagnetic field time series data among the moving path data of the electronic device 101 may be expressed as a single point having the dimension of 3N. In this way, the moving path data and measurement data may be interpreted as 3N-dimensional vector domain points and the distance between two points may be compared.

In an embodiment, the processor 120 may apply a binary hypothesis testing problem, as a method of determining whether to enter and/or advance to the first location. The processor 120 may mathematically sample maintenance pattern data by applying the binary hypothesis testing problem, may remove the average of the sampled data, and may apply a filter. To overcome the difference in path progression speed by applying the binary hypothesis testing problem, the processor 120 may apply DTW pre-processing, and may calculate a correlation between the stored vector value and the measured vector value, using the calculation of cosine similarity. The processor 120 may set a case of entering and/or advancing to the first location to the first hypothesis H1; the processor 120 may set a case of not entering and/or advancing to the first location to the second hypothesis H2 The processor 120 may set the measured magnetic field signal to y[n], may set the magnetic field signal of moving path data to s[n], may set a noise to w[n], and may set the magnetic field signal in a place other than a specific indoor place, to b[n]. The processor 120 may represent the binary hypothesis testing problem as shown in Equation 1.

$$\begin{cases} H1: y[n] = s[n] + w[n] \\ H2: y[n] = b[n] + w[n] \end{cases} \quad \text{[Equation 1]}$$

In an embodiment, the processor 120 may represent the binary hypothesis testing problem as shown in Equation 2 by removing the sample mean of the measured signals through a pre-processing process.

$$\begin{cases} H1: p[n] = y[n] - \frac{1}{N}\sum_{n=1}^{N} y[n] = s[n] + w[n] - \mu_s \\ H2: p[n] = y[n] - \frac{1}{N}\sum_{n=1}^{N} y[n] = b[n] + w[n] - \mu_b \end{cases} \quad \text{[Equation 2]}$$

In an embodiment, the processor 120 may represent vector t[n] as shown in Equation 3 by removing the sample mean from moving path data s[n] for comparison with measurement data p[n]

$$t[n] = s[n] - \mu_s \quad \text{[Equation 3]}$$

In an embodiment, to perform a correlation operation, the processor 120 may use a variance value and a standard deviation value for the pre-processed measurement magnetic field data and the pre-processed moving path magnetic field data. The processor 120 may perform the correlation operation on the pre-processed measurement magnetic field data in Equation 2 and the pre-processed moving path magnetic field data in Equation 3 as shown in Equation 4.

$$\frac{1}{N}\sum_{n=0}^{N-1} p[n]t[n] > \quad \text{[Equation 4]}$$

$$\frac{1}{2N}\left(\sum_{n=0}^{N-1} t^2[n] + p^2[n]\right) - \frac{\sigma_1^2}{2\sigma_2^2}\sum_{n=0}^{N-1} p^2[n] + \sigma_1^2 \ln\left\{\gamma^{\frac{1}{N}}\sqrt{\frac{\sigma_1^2}{\sigma_2^2}}\right\}$$

In an embodiment, the processor 120 may apply DTW to p[n] and t[n] through the preprocessing process. For the convenience of mathematical expression, the processor 120 may assume that the result of DTW of p[n] and t[n] is p[n] and t[n] identically.

In an embodiment, when modeling b[n] and w[n] into independent white Gaussian noise, the processor 120 may represent a threshold value for a case where the false alarm probability is γ. However, it is not limited thereto. Because b[n] is not actually independent white Gaussian noise, the processor 120 may experientially derive and use the threshold value.

In an embodiment, in a situation of the second hypothesis H2, the processor 120 may represent Equation 4 as shown in Equation 5.

$$\frac{1}{N}\sum_{n=0}^{N-1} p[n]t[n] > T\sqrt{\frac{\sigma_2^2 \sigma_s^2}{N}} \begin{cases} \sigma_s^2 = \sigma_t^2 = \frac{1}{N}\sum_{n=0}^{N-1} t^2[n] \\ \sigma_2^2 \frac{1}{N}\sum_{n=0}^{N-1} p^2[n] \text{ in } H2 \end{cases} \quad \text{[Equation 5]}$$

In an embodiment, the processor 120 may summarize Equation 5 as shown in Equation 6. The processor 120 may represent cosine similarity for two vectors p[n] and t[n].

$$\frac{\sum_{n=0}^{N-1} p[n]t[n]}{\sqrt{\sum_{n=0}^{N-1} p^2[n] \sum_{n=0}^{N-1} t^2[n]}} > T\sqrt{\frac{1}{N}} \quad \text{[Equation 6]}$$

In an embodiment, the processor 120 may calculate a correlation between the pre-processed moving path data 910 and the pre-processed measurement data 920 or 930 to compare the pattern between the pre-processed moving path data 910 and the pre-processed measurement data 920 or 930. When the processor 120 represents a gap between the pre-processed moving path data 910 and the pre-processed measurement data 920 or 930 in a vector space, the processor 120 may obtain an angle between the pre-processed moving path data 910 and the pre-processed measurement data 920 or 930.

In an embodiment, upon calculating the correlation between pre-processed moving path data 910 and the pre-processed measurement data 920 or 930, a weight value for each sample may be specified as shown in Equation 7. As described above, the actual values of b[n] and w[n] may be observed as correlated Gaussian noise, not white Gaussian noise. Accordingly, the correlation may be measured in a more suitable manner for a correlated Gaussian noise environment, by determining and applying the weight between samples in consideration of the correlation between samples.

$$\frac{1}{N}\sum_{n=0}^{N-1} \alpha_n p[n]t[n] > T\sqrt{\frac{\sigma_2^2 \sigma_s^2}{N}} \begin{cases} \sigma_s^2 = \sigma_t^2 = \frac{1}{N}\sum_{n=0}^{N-1} t^2[n] \\ \sigma_2^2 \frac{1}{N}\sum_{n=0}^{N-1} p^2[n] \text{ in } H2 \end{cases} \quad \text{[Equation 7]}$$

Here, $\alpha_n$ denotes a weight value applied to calculate the sample correlation between the n-th samples of p[n] and t[n].

In an embodiment, the processor 120 may obtain a vector Euclidean distance between the pre-processed moving path data 910 and the pre-processed measurement data 920 or 930. When the processor 120 expresses p[n] and t[n] in a vector space, a distance between a vector indicating p[n] and a vector indicating t[n] may be defined as a Euclidean distance. The processor 120 may compare patterns, using the correlation operation for p[n] and t[n] and the Euclidean distance together. The processor 120 may compare the distance in the vector space between the pre-processed moving path data 910 and the pre-processed measurement data 920 or 930 and the angle in the vector space.

In an embodiment, the processor 120 may derive the correlation and vector distance for each axis (X, Y, or Z axis) of the electronic device 101 and may add the results to make the final determination. For example, the processor 120 may derive an X-axis correlation C_X, an X-axis vector distance D_X, a Y-axis correlation C_Y, a Y-axis vector distance D_Y, a Z-axis correlation C_Z, and a Z-axis vector distance D_Z. The processor 120 may make the final determination by soft combining the derived result values C_X, C_Y, C_Z, D_X, D_Y, and D_Z.

In an embodiment, the processor 120 may compare the derived result values C_X, C_Y, C_Z, D_X, D_Y, and D_Z with specified threshold values, respectively, and may make the final determination through a logical operation using the results of the comparison. For example, when using the AND operation, the processor 120 may compare the six derived result values C_X, C_Y, C_Z, D_X, D_Y, and D_Z with test statistic. When all the compared values exceed a threshold value, the processor 120 may determine the first location. For another example, when using an OR operation, the processor 120 may compare the six derived result values C_X, C_Y, C_Z, D_X, D_Y, and D_Z with the test statistic, and then may determine the first location when any one of the compared values exceeds the threshold value.

In an embodiment, to compare the pattern between the pre-processed moving path data 910 and the pre-processed measurement data 920 or 930, the processor 120 may obtain codes of the pre-processed moving path data 910 and the pre-processed measurement data 920 or 930. The processor 120 may compare patterns of a code of the pre-processed moving path data 910 and a code of the pre-processed measurement data 920 or 930.

In an embodiment, the processor 120 may assign the order and/or inverse-order of the size of each sample of the pre-processed moving path data 910 and the pre-processed measurement data 920 or 930. For example, the processor 120 may assign the inverse-order of data signals composed of 999, 41, 2, and 123 as 4, 2, 1, and 3, respectively. The processor 120 may compare patterns of the pre-processed moving path data 910 and the pre-processed measurement data 920 or 930, to which the order is assigned.

In an embodiment, the processor 120 may compare the pattern between the pre-processed moving path data 910 and the pre-processed measurement data 920 or 930 based on the code and/or order. The processor 120 may compare shapes and/or forms of signals even though the sizes of signals are different. Accordingly, moving path data may be shared with users utilizing different types of the electronic device 101.

Figure 10:
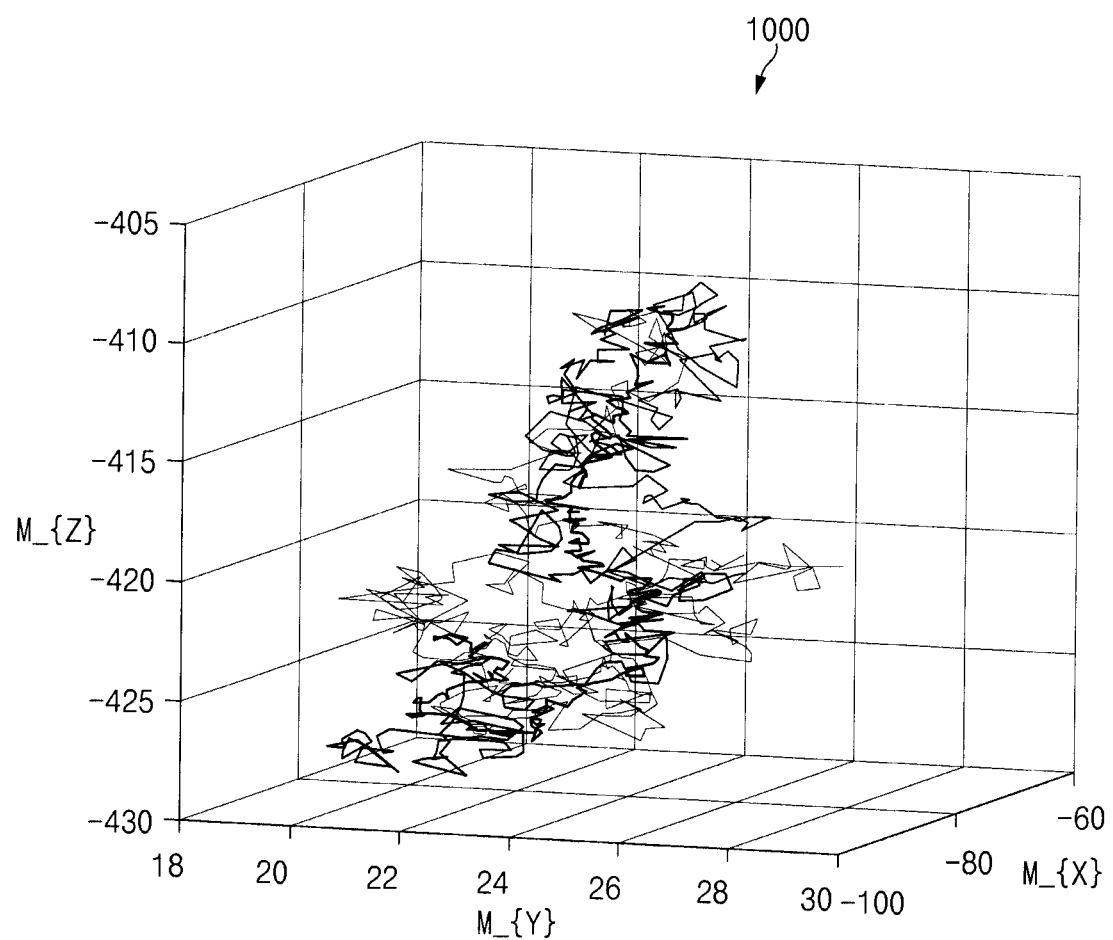
FIG. 10 is a diagram illustrating data obtained by measuring a magnetic field at a first location of an electronic device a plurality of times according to an embodiment.

FIG. 10 is a diagram 1000 illustrating data obtained by measuring a magnetic field at a first location of an electronic device (e.g., the electronic device 101 of FIG. 1) a plurality of times according to an embodiment. The processor 120 may represent the magnetic field value as a vector component and/or trace in 3D coordinate axes M_{X}, M_{Y}, and M_{Z}. The 3D coordinate axes M_{X} M_{Y}, and M_{Z} may represent the geomagnetic value M_{X} for X-axis, the geomagnetic value M_{Y} for Y-axis, and the geomagnetic value M_{Z} for Z-axis.

In an embodiment, the sensor module (e.g., the sensor module 176 of FIG. 1) may include a magnetometer. The processor 120 may measure a magnetic field value included in the moving path data, using the magnetometer.

In an embodiment, the magnetic field value may be calibrated to face the earth's north and/or the earth's magnetic north. When the magnetic field is measured outdoors using a calibrated magnetometer, because the magnetometer actually faces the Earth's north and/or Earth's magnetic north, the magnetometer may be used by an application (e.g., the application 146 of FIG. 1) indicating a direction, such as a compass, map, and/or navigation.

In an embodiment, when the processor 120 measures the magnetic field in an indoor environment using the magnetometer, the magnetometer measurement value and/or magnetometer direction may be changed or biased due to various factors such as the steel frame of concrete, elevators, escalators, metal furniture arranged indoors, and/or home appliances.

In an embodiment, the magnetic field value measured while being changed or biased in the magnetic north may reflect the features of an indoor location where the electronic device 101 is located. When the location of the electronic device 101 is changed indoors, the magnetic field value measured at the location may be changed. When a user moves indoors with the electronic device 101, the size and/or orientation of the magnetic field value may continuously be changed.

In an embodiment, the magnetic field value measured at the same location may be substantially identical or similar to a specified value (or threshold) even as time goes by. When a user passes by the same location multiple times at different times, the magnetic field value may be measured with a similar pattern.

Figure 11:
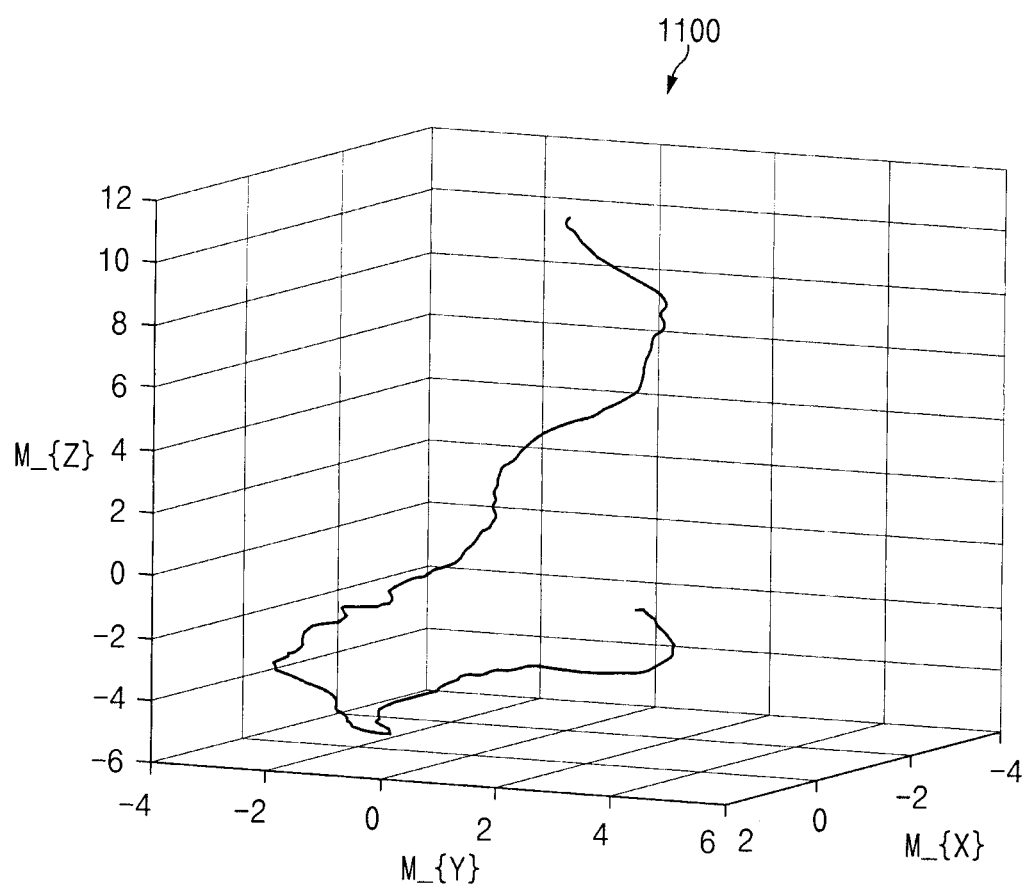
FIG. 11 is a diagram illustrating an average value of data obtained by measuring a magnetic field at a first location of an electronic device a plurality of times according to an embodiment.

FIG. 11 is a diagram 1100 illustrating an average value of data obtained by measuring a magnetic field at a first location of an electronic device (e.g., the electronic device 101 of FIG. 1) a plurality of times according to an embodiment.

In an embodiment, the processor (e.g., the processor 120 of FIG. 1) of the electronic device 101 may measure the magnetic field multiple times when entering the first location that is a specific indoor place. The processor 120 may measure the magnetic field of the moving path for entering the first location and may store the magnetic field as measurement data in a memory (e.g., the memory 130 of FIG. 1). The processor 120 may measure magnetic field components in the x-axis, y-axis, and z-axis direction of coordinates (x, y, z) in which the current location of the electronic device 101 is set to the origin, using a sensor module (e.g., the sensor module 176 in FIG. 1).

In an embodiment, the processor 120 may obtain a magnetic field measurement value for a moving path entering the first location. To explain data including the obtained magnetic field measurement value, as illustrated in FIGS. 10 and/or 11, the magnetic field components in the x-axis, y-axis, and z-axis direction of the coordinates (x, y, z), in which the current location of the electronic device 101 is set to the origin, are imaged and represented as x-axis, y-axis, and z-axis components.

In an embodiment, while a user passes by the same location multiple times at different times, the processor 120 may measure the geomagnetic value for the X-axis $M\_\{X\}$, the geomagnetic value for the Y-axis $M\_\{Y\}$, and the geomagnetic value for the Z-axis $M\_\{Z\}$, using the sensor module 176. The processor 120 may calculate the average value of the measured geomagnetic value $M\_\{X\}$ for X-axis, the measured geomagnetic value $M\_\{Y\}$ for Y-axis, and the measured geomagnetic value $M\_\{Z\}$ for Z-axis. The processor 120 may remove a bias value from the measured geomagnetic value $M\_\{X\}$ for X-axis, the measured geomagnetic value $M\_\{Y\}$ for Y-axis, and the measured geomagnetic value $M\_\{Z\}$ for Z-axis. After removing the bias value, the processor 120 may obtain an unique pattern having the geomagnetic values $M\_\{X\}$, $M\_\{Y\}$, and $M\_\{Z\}$ for each direction of X-axis, Y-axis, and Z-axis, as a magnetic field pattern.

Figure 12:
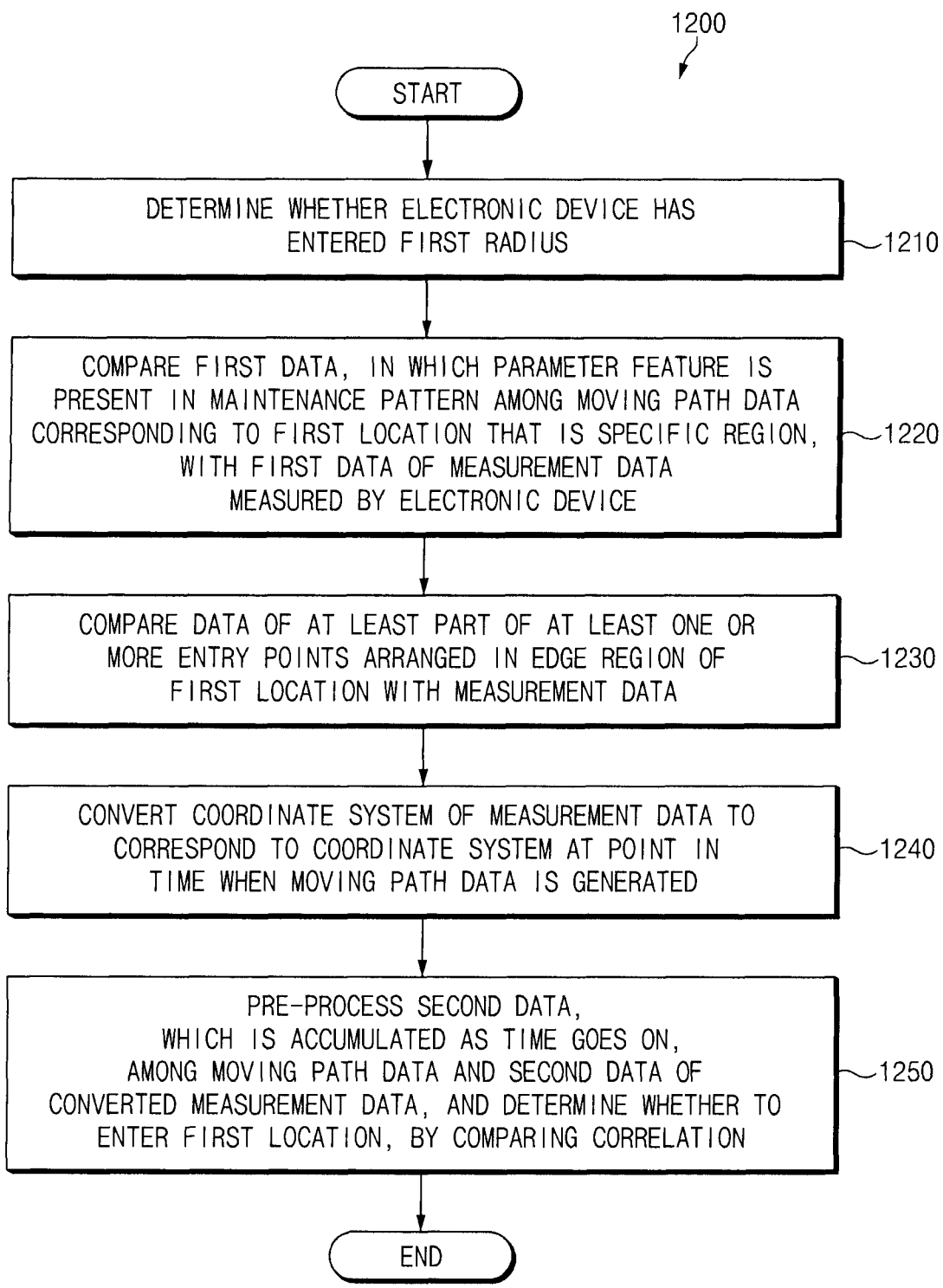
FIG. 12 is a flowchart illustrating a method in which an electronic device detects a location based on 2D moving path data, according to an embodiment.

FIG. 12 is a flowchart 1200 illustrating a method in which an electronic device (e.g., the electronic device 101 of FIG. 1) detects a location based on 2D moving path data, according to an embodiment. A method of determining whether to enter and/or advance to the first location that is a specific place indoors, based on moving path data is not limited to being applied to only the 1D path and/or moving path. The processor (e.g., the processor 120 of FIG. 1) of the electronic device 101 may detect a location in a substantially the same or similar manner by performing an additional data processing operation on a location for a 2D region.

In operation 1210, the processor 120 of the electronic device 101 according to an embodiment may determine whether the electronic device 101 has entered the first radius. Operation 1210 may be substantially the same as operation 810 described in FIG. 8A.

In operation 1220, the processor 120 of the electronic device 101 according to an embodiment may compare first data, in which a parameter feature is present in a maintenance pattern among moving path data corresponding to a first location that is a specific region, with first data of measurement data measured by the electronic device 101. Operation 1220 may be substantially the same as operation 820, operation 830, and operation 840 described in FIG. 8.

In operation 1230, the processor 120 of the electronic device 101 according to an embodiment may compare data of at least part of the at least one or more entry points arranged in the edge region of the first location with second data of the measurement data. The entry point may be second data on a point positioned on the edge region of the first location. For example, the entry point may be the geomagnetic values of the edge of the physical place defined as the first location. The processor 120 may utilize only second data of measurement data corresponding to the entry point by determining whether to enter the entry point of moving path data. In the case where the second data of the measurement data corresponding to the entry point is used, upon determining whether to enter the entry point, whether to enter the entry point may be quickly determined by reducing the amount of data processed by the processor 120.

In an embodiment, the processor 120 may select some of the entry points of the moving path data region, using measurement data; when pieces of moving path data including the selected entry points do not have the measurement data by the specified correlation value or more, the processor 120 may determine that the electronic device 101 has not entered the first location that is a specific indoor place. When the moving path data is defined as a 2D region, the processor 120 may set an entry point of an edge region. When a user passes by the entry point, the processor 120 may reduce data to be processed by determining a path having the possibility of entering a region.

In operation 1240, the processor 120 of the electronic device 101 according to an embodiment may convert the coordinate system of measurement data to correspond to the coordinate system at a point in time when the moving path data is generated. When the moving path data is defined as a 2D region, the processor 120 may convert the coordinate system of measurement data to be matched with the coordinate system of moving path data including the selected entry point. The processor 120 may compare correlation between patterns of moving path data and measurement data on the same coordinate system.

In operation 1250, the processor 120 of the electronic device 101 according to an embodiment may pre-process the second data accumulated as the time goes on, among the moving path data and the second data of the converted measurement data, and then may determine whether to enter the first location by comparing the correlation and/or a distance in a vector domain. When first data of moving path data corresponds to first data of measurement data, the processor 120 may pre-process second data of moving path data and second data of measurement data converted in operation 1240. The processor 120 may compare the second data of the pre-processed moving path data and the second data of the pre-processed and converted measurement data. Operation 1250 may be performed after operation 840 described in FIG. 8. Operation 1250 may be at least partly included in operation 850 described in FIG. 8.

In an embodiment, the processor 120 may determine whether to enter and/or advance to the first location, based on 1D moving path data through a moving path data-based pattern comparison operation. Alternatively, a plurality of 1D moving paths constituting the 2D region are defined with respect to a 2D region; whether to enter and/or advance to the first location may be determined by comparing the pattern between pieces of defined 1D moving path data and measurement data.

Figure 13:
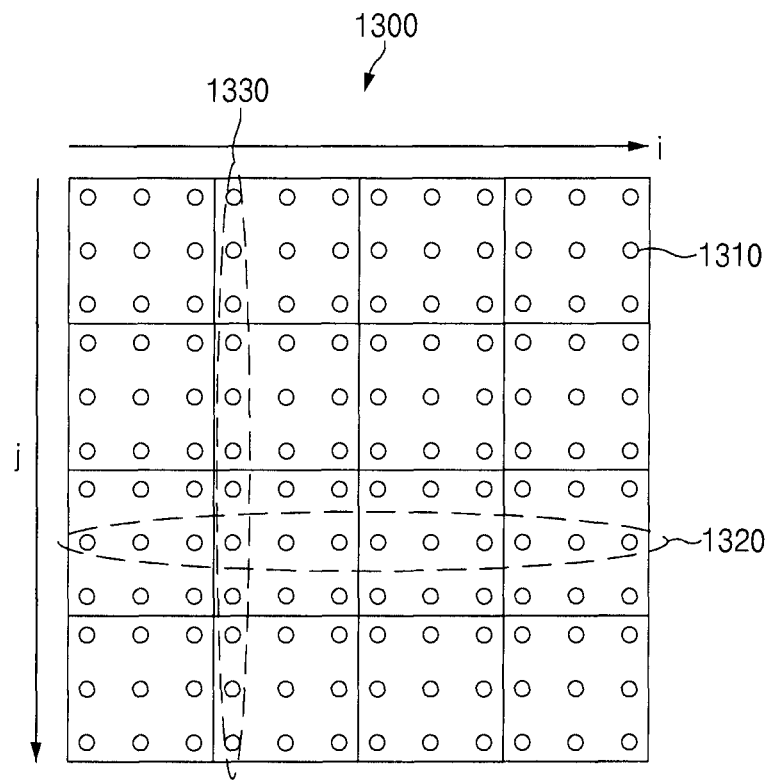
FIG. 13 is a diagram illustrating geographic coordinates of 2D moving path data according to an embodiment.

FIG. 13 is a diagram 1300 illustrating geographic coordinates (i, j) of 2D moving path data according to an embodiment.

In an embodiment, the 2D moving path data may include a magnetic field measurement value for a 2D plane. The 2D plane may be a planar and spatial extent at a first location that is a specific indoor place. The magnetic field measurement value for the 2D plane may include geomagnetic values at discrete magnetic field sample points 1310 on the 2D plane, which is a continuous space. For example, the magnetic field value on the 2D plane may be expressed as the total of 144 magnetic field sample points 1310. The coordinates (i, j) of the 2D plane may include two orthogonal axes that define the 2D plane. The coordinates (i, j) of the 2D plane may be an axis different from the coordinates (x, y, z) of FIG. 6 that is an axis in which the electronic device 101 is defined as an origin. The processor (e.g., the processor 120 of FIG. 1) of the electronic device (e.g., the electronic device 101 of FIG. 1) may define the 2D plane to be assigned to the first location, based on the coordinates (i, j). The processor 120 may set the magnetic field sample points 1310 to obtain a magnetic field on the 2D plane.

A method of obtaining moving path data corresponding to the 2D space may obtain moving path data corresponding to the space, using information of a sensor, camera, or the like when a user moves the electronic device 101 several times in the space; Furthermore, the method may instruct the user to move the electronic device 101 on the space through a user interface with the user, may collect data of the sensor module and wireless communication module in the electronic device 101, which moves depending on the instructions, and may correspond the collected data to the 2D space.

In an embodiment, the processor 120 may determine whether to enter and/or advance to the 2D space by applying the method described in FIGS. 8 to 12 to all 1D moving paths for making discrete moving path data. For example, to determine whether to enter and/or advance to the 2D space, the processor 120 may determine whether to enter/advance the 1D moving path such as the first moving path 1320 and the second moving path 1330.

Figure 14:
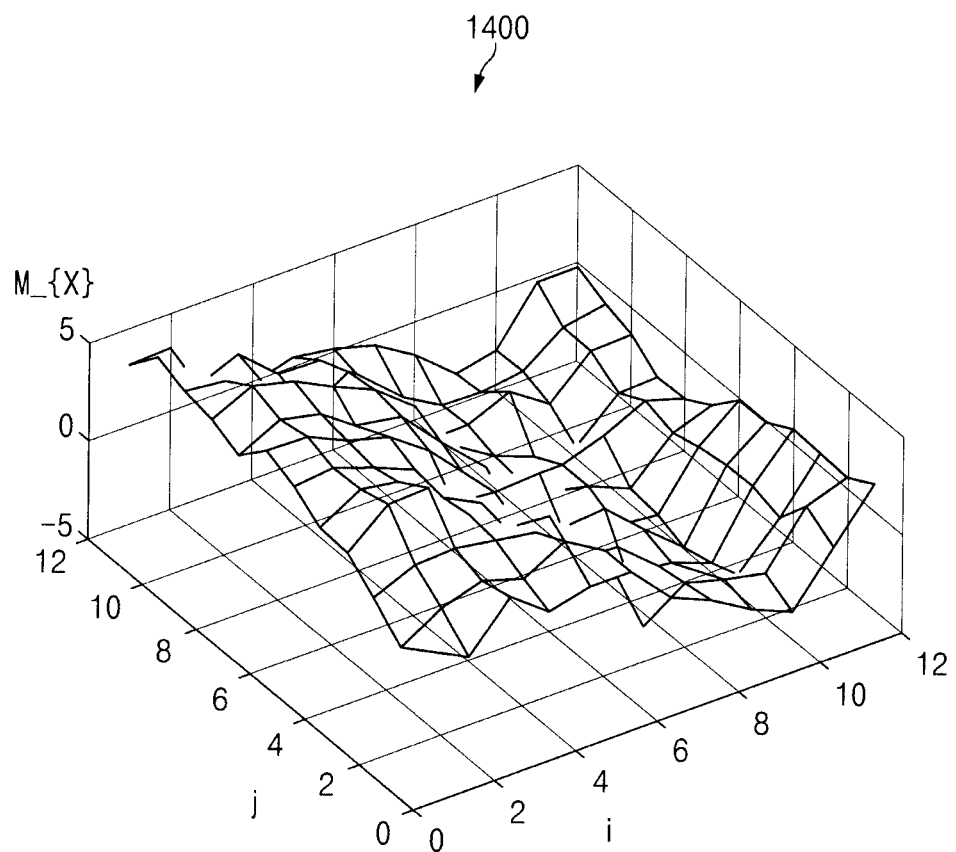
FIG. 14 is a diagram illustrating an X-axis component of magnetic field of 2D moving path data, according to an embodiment.
Figure 15:
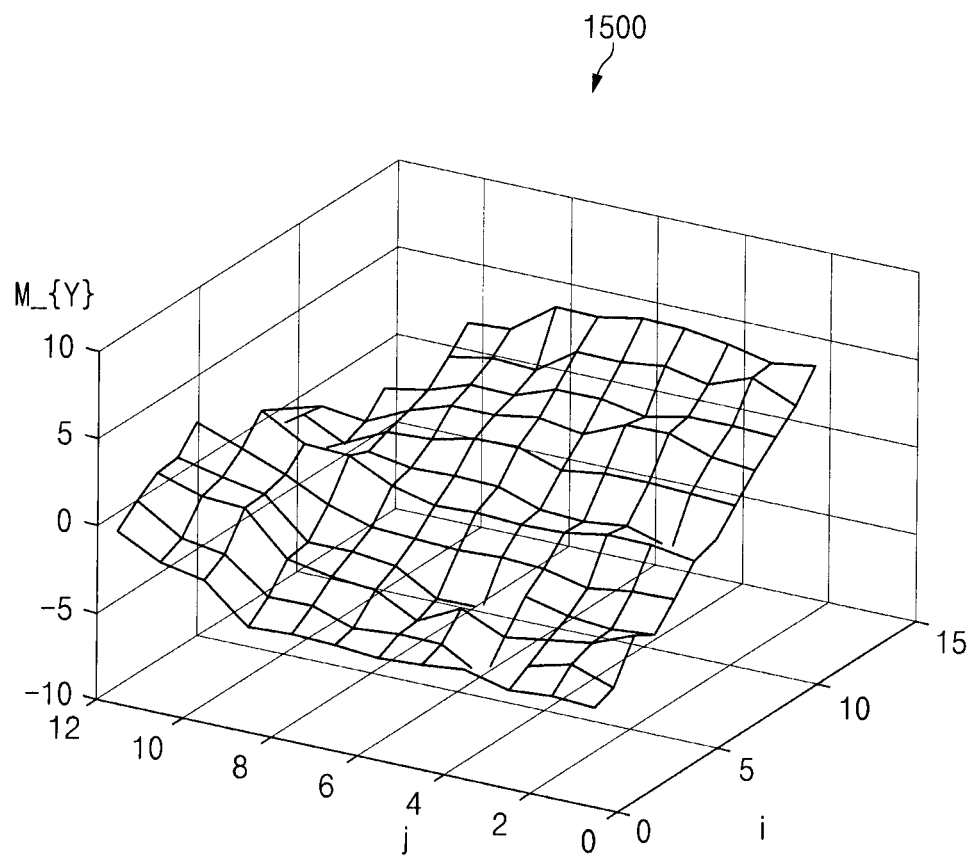
FIG. 15 is a diagram illustrating a Y-axis component of magnetic field of 2D moving path data, according to an embodiment.
Figure 16:
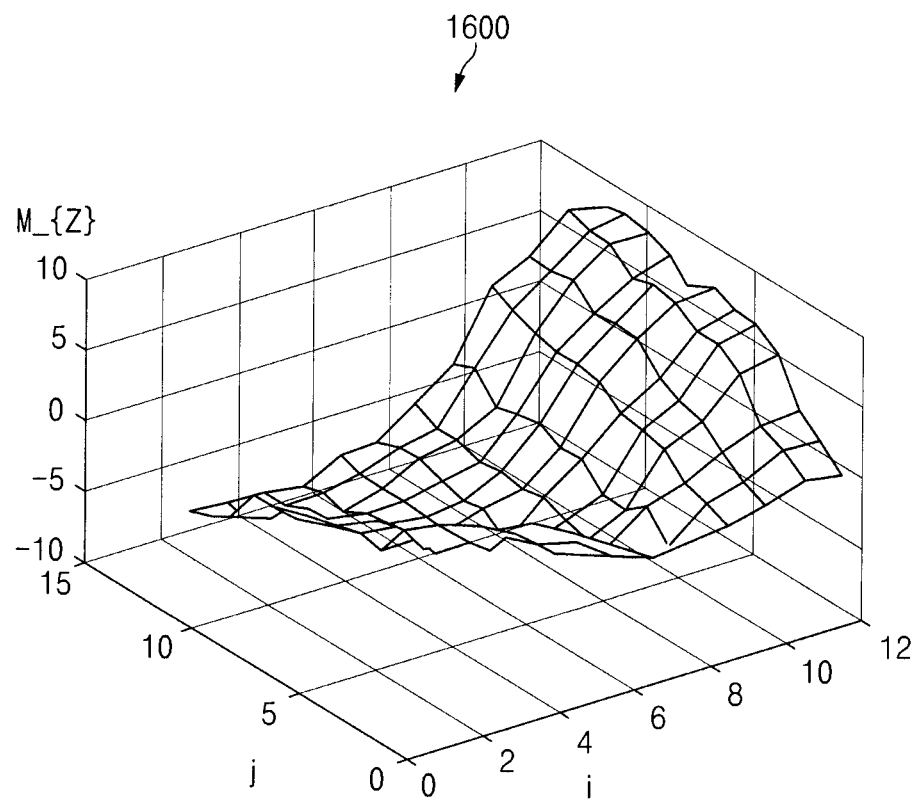
FIG. 16 is a diagram illustrating a Z-axis component of magnetic field of 2D moving path data, according to an embodiment.

FIG. 14 is a diagram 1400 illustrating an X-axis component of magnetic field of 2D moving path data, according to an embodiment. FIG. 15 is a diagram 1500 illustrating a Y-axis component of magnetic field of 2D moving path data, according to an embodiment. FIG. 16 is a diagram 1600 illustrating a Z-axis component of magnetic field of 2D moving path data, according to an embodiment. According to an embodiment, data of a 2D virtual marker generated using the magnetic field value measured by the electronic device 101 may be generated. When the generated data is imaged, a component $X\_\{M\}$ of the X-axis magnetic field, a component $Y\_\{M\}$ of the Y-axis magnetic field, and a component $Z\_\{M\}$ of the Z-axis magnetic field may be represented in FIGS. 15 to 17. The magnetic field values measured in the X-axis, Y-axis, and Z-axis directions of the electronic device 101 may have different values depending on a location in a 2D space. Accordingly, the magnetic field values may have a unique pattern for each axis direction and for each progress direction depending on the progress in the space. The processor 120 (e.g., the processor 120 of FIG. 1) of the electronic device 101 may not only increase the accuracy of detection by comparing all values of the three axes X, Y, and Z, and but also reduce the possibility of false alarm of a 2D virtual marker by increasing the precision.

In an embodiment, the processor 120 of the electronic device 101 may measure the magnetic field strength $M\_\{X\}$ in the X-axis direction, the magnetic field strength $M\_\{Y\}$ in the Y-axis direction, and the magnetic field strength $M\_\{Z\}$ in the Z-axis direction, using the magnetic field sensor of the sensor module 176 on the 2D plane (i, j). For example, referring to FIGS. 14 to 16, on a 2D plane (i, j), the magnetic field strength $M\_\{X\}$ in the X-axis direction at the point defined as (10, 10) may be about −2.5; the magnetic field strength $M\_\{Y\}$ in the Y-axis direction may be about −5; and the magnetic field strength $M\_\{Z\}$ in the Z-axis direction may be about −5. The display device (e.g., the display device 160 of FIG. 1) of the electronic device 101 may generate a 2D virtual marker, using a magnetic field value measured by a sensor module (e.g., the sensor module 176 of FIG. 1). For example, the 2D virtual marker may be used for each of the X, Y, and Z axis components of the electronic device 101. For example, the electronic device 101 may store a 2D virtual marker in a memory (e.g., the memory 130 of FIG. 1). For another example, the electronic device 101 may image a magnetic field value for each of X, Y, and Z axis components to identify a 2D virtual marker.

In an embodiment, the processor 120 may represent the magnetic field values measured on a 2D plane for each axis component. The magnetic field value on the 2D plane may vary depending on the location on coordinates (i, j). For example, referring to FIGS. 14 to 16, at any one point, the magnetic field strength $M\_\{X\}$ in the X-axis direction may be about −2.5; the magnetic field strength $M\_\{Y\}$ in the Y-axis direction may be about −5; and the magnetic field strength $M\_\{Z\}$ in the Z-axis direction may be about −5. The processor 120 may determine any one point as a point defined as (10, 10) on the 2D plane (i, j), based on the magnetic field strength $M\_\{X\}$ in the X-axis direction, the magnetic field strength $M\_\{Y\}$ in the Y-axis direction, and the magnetic field strength $M\_\{Z\}$ in the Z-axis direction, which are measured on the 2D plane (i, j).

In an embodiment, to determine whether to enter and/or advance to the first location, the processor 120 may compare patterns of measurement data and moving path data for 1D moving paths for making discrete moving path data. The geographic space illustrated in FIGS. 14 to 16 may correspond to the total region of 4 m², in which i-axis has 2 meters and j-axis has 2 meters. It may be identified that patterns of 1D moving path data appear variously even in a 2D region of 4 m². Accordingly, to accurately detect the corresponding 2D region, pieces of 1D moving path data need to be detected. As such, the number of 1D moving paths for making discrete moving path data expressed in a 2D space may be increased. When there are too many 1D moving paths, the time delay may occur due to an increase in the amount of data calculated by the processor (e.g., the processor 120 of FIG. 1) of the electronic device (e.g., the electronic device 101 of FIG. 1) and an increase in time required for the calculation of the processor 120. The processor 120 may reduce the time delay by reducing the number of 1D moving paths for making discrete moving path data expressed in a 2D space.

In an embodiment, a user may maintain the progress direction in the process of entering and/or advance to the first location. Because the first location is a specific place indoors, when the first location is a 2D space, the first location may be a region where it is not easy for the user to change the progress direction considering the user's physical activity. The processor 120 may assume that the user maintains the moving direction at the first location without changing the moving direction. The processor 120 may model the shape and/or form of the 1D moving path in a straight line.

In an embodiment, patterns of 1D moving path data adjacent on a 2D plane may be similar to one another. The processor 120 may process the patterns of 1D moving path data adjacent on the 2D plane as substantially the same as one another. When the adjacent patterns of 1D moving path data are similar to one another, the processor 120 may represent all adjacent patterns of pieces of 1D moving path data by approximating all the adjacent patterns of pieces of 1D moving path data to a pattern of a piece of moving path data having representativeness.

In an embodiment, when the electronic device 101 enters and/or advances to the first location, the electronic device 101 may pass through one of entry points in the 2D plane. The entry point may be a sample point 1310 arranged at the edge of the 2D plane among sample points (e.g., the magnetic field sample points 1310 of FIG. 13) on the 2D plane. When the electronic device 101 enters and/or advances to the first location, the entry point may be a point that needs to be physically passed. When the measurement data does not have the feature of the entry point, the processor 120 may quickly determine that the electronic device 101 has not entered and/or advanced to the first location, thereby reducing the amount of data to be calculated.

Figure 17:
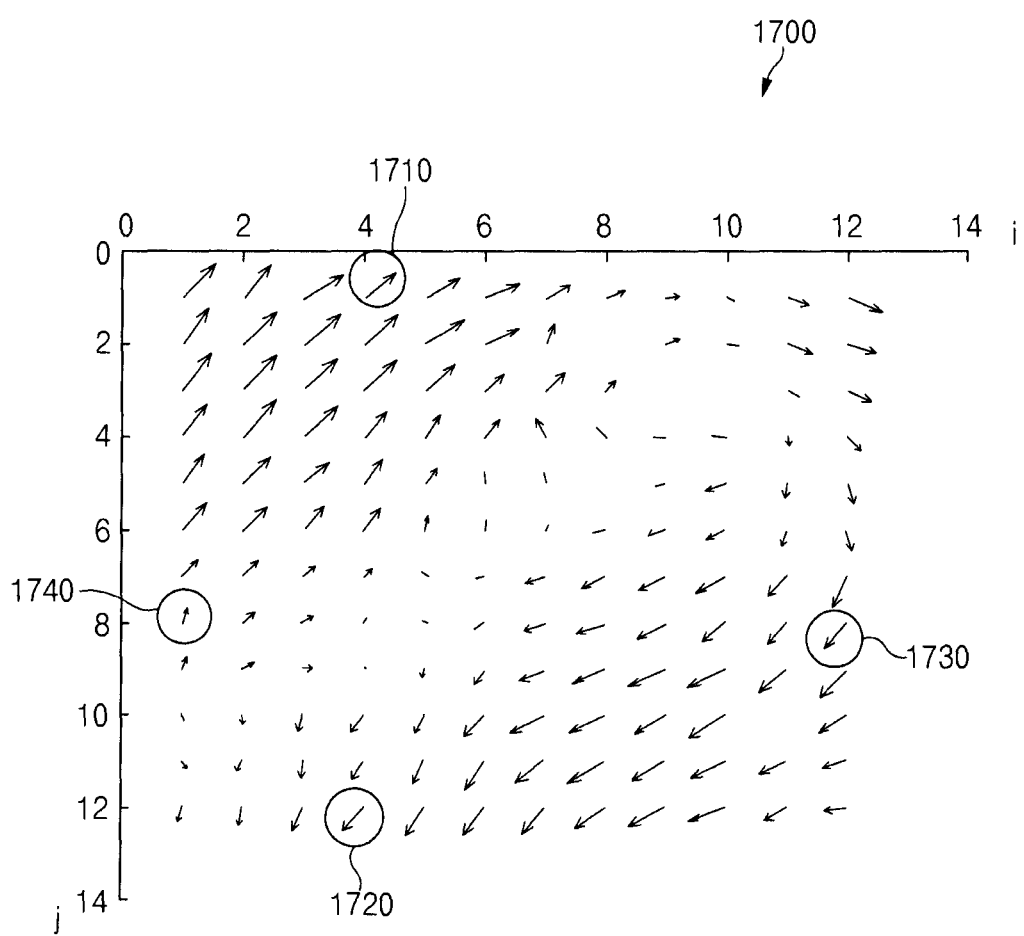
FIG. 17 is a diagram illustrating a magnetic field value of 2D moving path data as a vector, according to an embodiment.

FIG. 17 is a diagram 1700 illustrating a magnetic field value of 2D moving path data as a vector, according to an embodiment. The processor (e.g., the processor 120 of FIG. 1) of the electronic device (e.g., the electronic device 101 of FIG. 1) may obtain a magnetic field value among discrete moving path data for a 2D plane (i, j). The magnetic field value may be a geomagnetic value (M_{X}, M_{Y}) in the X-axis and Y-axis directions at a point on the 2D plane (i, j).

In an embodiment, the magnetic field value may be measured at magnetic field sample points (e.g., the magnetic field sample points 1310 of FIG. 13) including first to fourth entry points 1710, 1720, 1730, and 1740. The first and second entry points 1710 and 1720 may be entry points for 1D moving path data indicated as the second path 1330 of FIG. 13. The third and fourth entry points 1730 and 1740 may be entry points for 1D moving path data indicated as the first path 1320 of FIG. 13.

In an embodiment, the direction and/or size of the magnetic field measured at the first to fourth entry points 1710, 1720, 1730, and 1740 may be different from one another. The processor 120 may determine whether the electronic device 101 enters and/or advances to the first location on the 2D plane, using only 1D moving path data of which the feature of at least one entry point of 1D moving path data is similar to that of each of the first to fourth entry points 1710, 1720, 1730, and 1740 of measurement data.

In an embodiment, the processor 120 may use a pattern to select an entry point. The processor 120 may compare patterns by additionally sampling some of the 1D moving path data. For example, when the length of 1D moving path data is composed of 100 samples, the processor 120 may perform pattern comparison using only 10 samples.

In an embodiment, the processor 120 may compare patterns, using the type of a graph based on a plurality of entry points for a 1D moving path. The processor 120 may identify a pattern by deriving a slope using two entry points for a single 1D moving path. The processor 120 may compare the pattern for the 1D moving path by defining a graph outline such as monotonically increasing, monotonically decreasing, upwardly convex, and downwardly convex shapes.

When detecting an entrance for the 2D moving path data described with reference to FIGS. 14 to 17, for example, it may be necessary to detect the entrance for 12 pieces of moving path data, in i-axis direction, and it may be necessary to detect the entrance for 12 pieces of moving path data, in j-axis direction. As such, as the number of piece of moving path data increases, the amount of computation to be performed may increase. The number of piece of moving path data may affect the current consumption and computational performance of the electronic device 101.

To overcome the increase in current consumption and the decrease in computation performance due to the increase in moving path data, the processor 120 may calculate a piece of representative moving path data, using several pieces of moving path data having similar patterns, and may detect the entrance for only the representative moving path data. The processor 120 may reduce the amount of computation and current consumption by detecting the entrance for only the representative moving path data. In this specification, an embodiment is exemplified as a method of deriving representative moving path data by clustering moving paths is introduced among various methods of deriving representative moving path data as an example.

Figure 18:
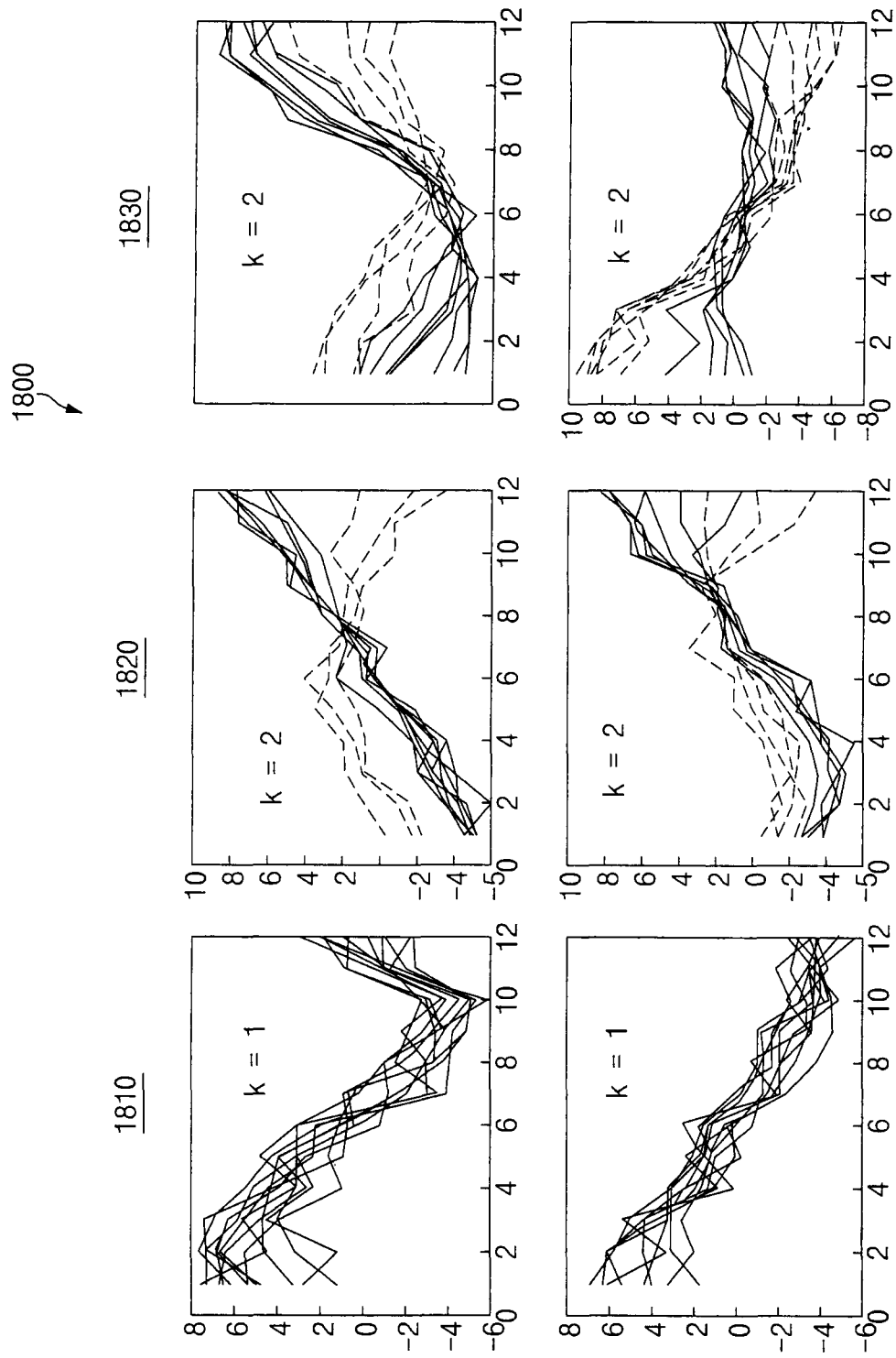
FIG. 18 is a graph illustrating results of clustering 1D moving path data, according to an embodiment.

FIG. 18 is a graph 1800 illustrating results 1810, 1820, and 1830 of clustering 1D moving path data, according to an embodiment.

In an embodiment, the processor (e.g., the processor 120 of FIG. 1) of the electronic device (e.g., the electronic device 101 of FIG. 1) may divide 2D moving path data into piece of 1D moving path data, and may cluster pieces of 1D moving path data. The processor 120 may use the 2D moving path data as a representative value of the clustered pieces of 1D moving path data.

In an embodiment, the processor 120 may remove the sample average for each 1D moving path constituting the 2D moving path data. The processor 120 may observe similar patterns in the 1D moving path. The processor 120 may represent pieces of 1D moving path data of a similar pattern as a single representative value. The processor 120 may group 1D moving paths corresponding to entry points (e.g., the first to fourth entry points 1710, 1720, 1730, and 1740 in FIG. 17) into a single cluster.

Figure 19:
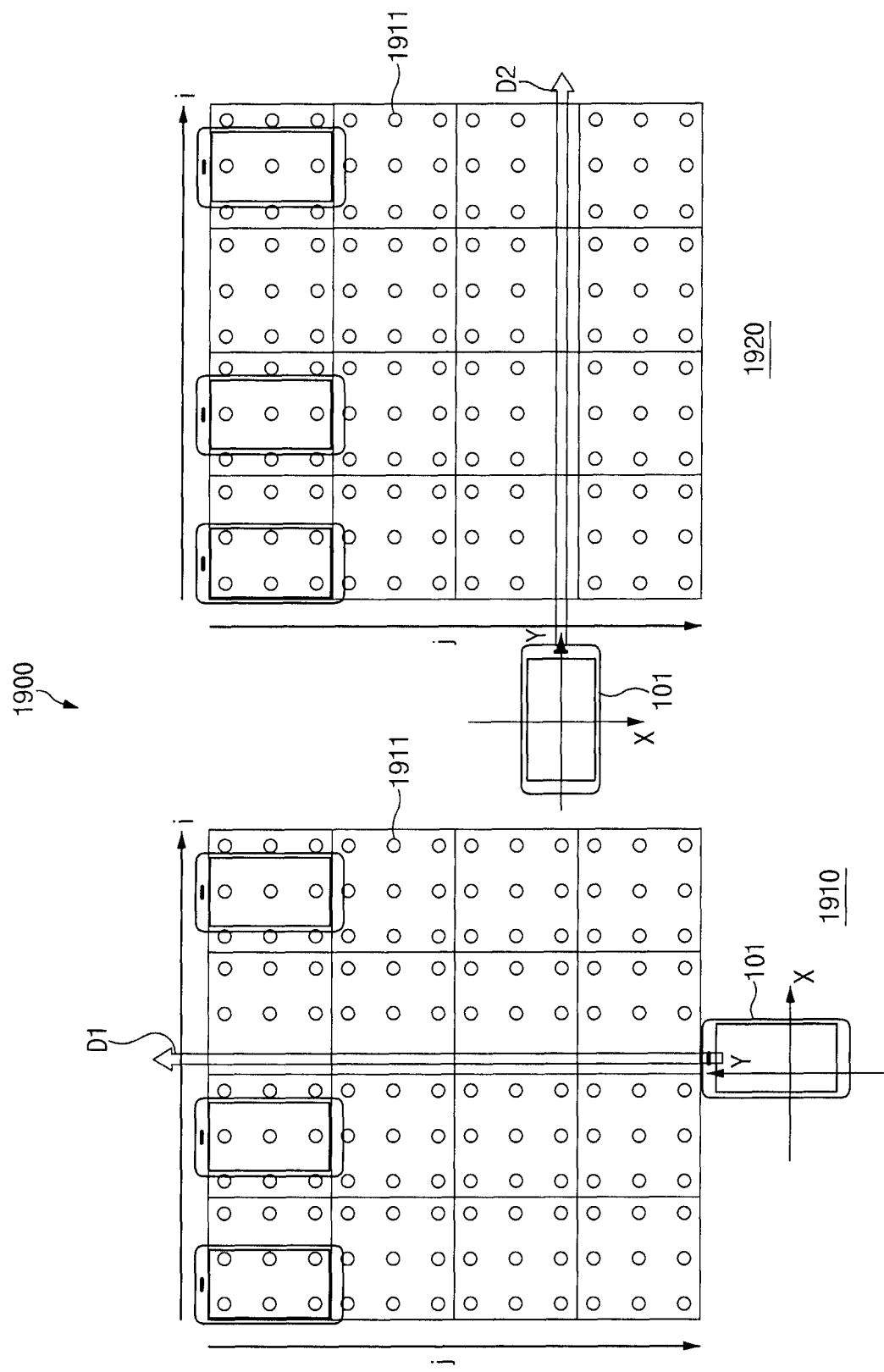
FIG. 19 is a diagram illustrating a direction of an electronic device upon generating moving path data and directions of an electronic device upon entering a first location, according to an embodiment.

In an embodiment, the processor 120 may cluster the 1D moving paths by applying K Nearest Neighbor (KNN) algorithm. The first result 1810 in the case where value K is 1 may be different from the second and third results 1820 and 1830 in the case where value K is 2. K may denote the number of clusters (e.g., in the case of the second result 1820 with value K of 2, 12 pieces of moving path data are divided into two clusters), the single cluster may have at least a piece of representative moving path data. The representative moving path data may be calculated as a data value having predefined representativeness such as an average value or an intermediate value of pieces of moving path data corresponding to a cluster. Alternatively, the moving path closest to the center of the cluster may be selected among the moving path data, and then the selected moving path may be calculated as representative moving path data. FIG. 19 is a diagram 1900 illustrating a direction (j-axis direction) of the electronic device 101 upon generating moving path data and directions D1 and D2 of the electronic device upon entering a first location, according to an embodiment.

In an embodiment, moving path data may be generated for a first location including a plurality of magnetic field sample points 1911. The moving path data may be expressed in a specified direction for measurement data (e.g., a magnetic field value, and/or the speed and/or acceleration value of the electronic device 101) collected based on the coordinate system (e.g., coordinates (x, y, z) in FIG. 6) of the electronic device 101 by fixedly setting the direction of the electronic device 101. For example, when moving path data is generated, the y-axis direction of the electronic device 101 may be the same as the j-axis direction. A user may align the electronic device 101 such that the y-axis that is the long side of the electronic device 101 is parallel to the j-axis of the first location. In a state where the user fixes the speaker portion (e.g., the sound output device 155 of FIG. 1) of the electronic device 101 in −j-axis direction and the microphone portion (e.g., the input device 150 of FIG. 1) of the electronic device 101 in +j-axis direction, the user may grip the electronic device 101. The processor 120 of the electronic device 101 may generate moving path data while being gripped.

In an embodiment, the electronic device 101 may enter a first location including a plurality of magnetic field sample points 1911. The processor 120 may compare the generated moving path data and measurement data to determine whether the user enters the corresponding indoor specific place.

In an embodiment, when the direction D1 of the electronic device 101 at a point in time when the user passes the corresponding area is a first direction D1, as illustrated in the first situation 1910, the direction (j-axis direction) of the electronic device 101 at a point in time when moving path data is generated is the same as the direction D1 of the electronic device 101 at a point in time when the user passes through the corresponding area. According to one embodiment, as in operation 850 described in FIG. 8, the processor 120 may calculate correlation by comparing patterns of moving path data and measurement data.

In an embodiment, when the direction D1 of the electronic device 101 at a point in time when the user passes the corresponding area is the first direction D1, as illustrated in the second situation 1920, the direction (j-axis direction) of the electronic device 101 at a point in time when the processor 120 of the electronic device 101 generates moving path data is different from the direction D2 of the electronic device 101 at a point in time when the user passes through the corresponding area. The difference between the direction (j-axis direction) of the electronic device 101 at a point in time when the processor 120 generates moving path data and the direction D2 of the electronic device 101 at a point in time when the user passes the corresponding area occurs, the processor 120 may obtain the angle formed by the direction D2 of the electronic device 101 to be entered by the user, and the direction (j-axis direction) of the electronic device 101 upon generating moving path data with respect to each 1D moving path constituting the 2D moving path data. The processor 120 may perform a coordinate and/or axis transformation operation such as a rotation matrix and/or a quaternion on the direction D2 of the electronic device 101 to be entered by the user and/or the direction (j-axis direction) of the electronic device 101 upon generating moving path data. The processor 120 of the electronic device 101 may calibrate a direction in which the electronic device 101 faces upon generating moving path data such that the direction of the measurement data measured when the user grips and moves the electronic device 101 after the moving path data is generated corresponds to the direction in which the electronic device 101 faces upon generating moving path data.

According to certain aspects of the disclosure a location detecting method of an electronic device, comprises: determining whether the electronic device enters a first region including a first location that is along a specific path or in a specific region; when determining that the electronic device entered the first region, selecting a signal type capable of being supported by the electronic device among a signal type list of items defined as moving path data corresponding to the first location; distinguishing the first data, in which a parameter feature is present, and second data having a maintenance pattern for a moving path, among the signal type; comparing first data of the moving path data with first data of measurement data measured by the electronic device; and when the first data of the moving path data corresponds to the first data of the measurement data, comparing patterns after pre-processing both second data of the moving path data and second data of the measurement data to determine entry to the first location.

According to certain embodiments, the method further comprises receiving an input indicating whether the electronic device entered the first location; and when the determination that the electronic device has entered the first region is different from the input, modifying a method of determining whether the electronic device has entered the first location.

According to certain embodiments, the moving path data includes a magnetic field vector value measured based on coordinates for specifying a location or a direction of the electronic device, or parameter values for a cellular signal, a wireless LAN signal, or a Bluetooth signal based on the coordinates.

According to certain embodiments, the method further comprises: selecting data having a reliability of detecting the location and/or the direction of the electronic device in the signal type list of items exceeding a threshold value; and setting a resource bit mask flag for a resource capable of being supported by the electronic device.

According to certain embodiments, the method further comprises setting a data bit mask flag for data, of which the moving path discrimination is not less than the specified threshold value, to 1; and setting the data bit mask flag for data, of which the moving path discrimination is less than the specified threshold value, to 0.

According to certain embodiments, the method further comprises, when determining that a user is close to the first location, performing an AND operation by using a data bit mask flag and the resource bit mask flag as inputs; and determining a resource necessary to generate the measurement data based on the result of the AND operation of the data bit mask flag and the resource bit mask flag.

According to certain embodiments, the method further comprises performing pre-processing on the moving path data and the measurement data; deriving a vector distance and/or correlation between the pre-processed moving path data and the pre-processed measurement data in a vector space; and combining the derived results.

According to certain embodiments, the method further comprises determining whether there is entry or advancement to the first location, based on binary hypothesis testing.

According to certain embodiments, an electronic device comprises a sensor module configured to sense sensing data; a wireless communication module configured to transmit or receive a wireless signal; a memory configured to store a virtual marker platform; and a processor operatively connected to the sensor module and the memory, wherein the processor is configured to: determine whether the electronic device enters a first region including a first location that is a long a specific path or in a specific region; when determining that the electronic device entered the first region, select a signal type capable of being supported by the electronic device among a signal type list of items defined as moving path data corresponding to the first location; distinguish first data, in which a parameter feature is present, and second data having a maintenance pattern for a moving path, among the signal type; compare the first data of the moving path data with first data of measurement data measured by the electronic device; and when the first data of the moving path data corresponds to the first data of the measurement data, compare patterns after pre-processing both second data of the moving path data and second data of the measurement data to determine entry to the first location.

According to certain embodiments, the processor is configured to receive an input indicating whether the electronic device entered the first location; and when the determination that the electronic device has entered the first region is different from the input, modify a method of determining whether the electronic device has entered the first location.

According to certain embodiments, the moving path data includes a magnetic field vector value measured based on coordinates for specifying at least one of a location, a direction of the electronic device, parameter values for a cellular signal, a wireless LAN signal, and Bluetooth signal based on the coordinates.

According to certain embodiments, the processor is configured to select data having a reliability of detecting the location and/or the direction of the electronic device in the signal type list of items exceeding a threshold value; and set a resource bit mask flag for a resource capable of being supported by the electronic device.

According to certain embodiments, the processor is configured to set a data bit mask flag for data, of which the moving path discrimination is not less than the specified threshold value, to 1; and set the data bit mask flag for data, of which the moving path discrimination is less than the specified threshold value, to 0.

According to certain embodiments, the processor is configured to: when determining that a user is close to the first location, perform an AND operation by using a data bit mask flag and the resource bit mask flag as inputs; and determine a resource necessary to generate the measurement data based on the result of the AND operation of the data bit mask flag and the resource bit mask flag.

According to certain embodiments, the processor is configured to: perform pre-processing on the moving path data and the measurement data; derive a vector distance and/or correlation between the pre-processed moving path data and the pre-processed measurement data in a vector space; and combine the derived results.

According to certain embodiments, a method comprises determining whether the electronic device enters a first region including a first location that is along a specific path or in a specific region; when determining that the electronic device entered the first region, comparing first data, in which a parameter feature is present, among moving path data corresponding to the first location with first data of measurement data measured by the electronic device; comparing data at least part of at least one or more entry points arranged in an edge region of the first location with the measurement data; changing a coordinate system of the measurement data to correspond to a coordinate system at a point in time when the moving path data is generated; and when the first data of the moving path data corresponds to the first data of the measurement data, comparing patterns after pre-processing both second data having a maintenance pattern for a moving path of the moving path data and second data of the measurement data to determine whether to enter the first location.

According to certain embodiments, the method further comprises selecting some of the entry points of a region of the moving path data, using the measurement data; and when the selected entry points do not have the measurement data by a specified correlation value or more, determining that the first location is not entered.

According to certain embodiments, the method further comprises modeling shapes or forms of a plurality of one-dimensional (1D) moving paths included in the first location in a straight line; and processing a pattern of an adjacent 1D moving path data among the plurality of 1D moving paths to be substantially the same.

According to certain embodiments, the method further comprises determining whether the electronic device enters and/or advances to the first location, using only 1D moving path data, in which a feature of an entry point of at least a piece of 1D moving path data is similar to a feature of at least one entry point of the measurement data.

According to certain embodiments, the method further comprises dividing two-dimensional (2D) moving path data into pieces of 1D moving path data and clustering and expressing the pieces of 1D moving path data; and using the 2D moving path data as a representative value of the clustered pieces of 1D moving path data.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

According to the embodiments disclosed in this specification, an electronic device may increase the accuracy of detecting whether the electronic device has entered a specific indoor place.

According to the embodiments disclosed in this specification, the electronic device may detect whether to enter a specific indoor place, based on moving path data for a path for entering the specific indoor place, and then may detect whether to enter the specific indoor place, without an indoor geographic map and/or indoor wireless signal map.

According to the embodiments disclosed in this specification, to detect whether an electronic device has entered a specific indoor place, an indoor location measurement service may be easily spread without installation of additional infrastructures such as a Bluetooth beacon generator.

Besides, a variety of effects directly or indirectly understood through the specification may be provided.

While the disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. A method for location detecting in an electronic device, the method comprising:

registering a first location which is a specific indoor place as a virtual marker, wherein the virtual marker includes moving path data corresponding to the first location;

determining whether the electronic device enters a first region which is a region within a specific radius from the first location by positioning the electronic device;

responsive to determining that the electronic device entered the first region, obtaining measurement data measured wirelessly by the electronic device;

comparing parameter varying data of the moving path data with first data of the measurement data, wherein the parameter varying data is data with feature points in a pattern type stored in the virtual marker according to a place where the electronic device is located; and responsive to the parameter varying data of the moving path data corresponding to the first data of the measurement data:

setting a first hypothesis of entering the first region and advancing to the first location, and a second hypothesis of entering the first region and not advancing to the first location;

pre-processing both maintenance pattern data of the moving path data and second data of the measurement data;

obtaining a correlation on the pre-processed second data and the pre-processed maintenance pattern data;

obtaining a vector distance between the pre-processed second data and the pre-processed maintenance pattern data; and obtaining a code of the pre-processed second data and the pre-processed maintenance pattern data;

assigning an order of a size of each sample of the pre-processed second data and the pre-processed maintenance pattern data;

determining whether the electronic device advances to the first location by comparing the correlation and the vector distance with specified threshold values respectively and comparing a pattern between the pre-processed second data and the pre-processed maintenance pattern data based on at least one of the code or the order; and in response to determining that the electronic device advances to the first location, executing at least one of a health application or a payment application, associated with the first location or displaying an indication of an event occurring at the first location;
wherein the maintenance pattern data has a maintenance pattern for a moving path.

2. The method of claim 1, further comprising:
receiving an input indicating whether the electronic device entered the first location; and
when the determination that the electronic device has entered the first region is different from the input, modifying a method of determining whether the electronic device has entered the first location.

3. The method of claim 1, wherein the moving path data includes a magnetic field vector value measured based on coordinates for specifying a location or a direction of the electronic device, or parameter values for a cellular signal, a wireless LAN signal, or a Bluetooth signal based on the coordinates.

4. The method of claim 1, further comprising:
selecting data having a reliability of detecting a location and/or direction of the electronic device in signal type list of items exceeding a threshold value; and
setting a resource bit mask flag for a resource capable of being supported by the electronic device.

5. The method of claim 4, further comprising:
setting a data bit mask flag for data, of which moving path discrimination is not less than a specified threshold value, to 1; and
setting the data bit mask flag for data, of which the moving path discrimination is less than the specified threshold value, to 0.

6. The method of claim 4, further comprising:
when determining that a user is close to the first location, performing an AND operation by using a data bit mask flag and the resource bit mask flag as inputs; and
determining a resource necessary to generate the measurement data based on a result of the AND operation of the data bit mask flag and the resource bit mask flag.

7. The method of claim 1, wherein the moving path data which includes entry points of a 1D moving paths are grouped into a single cluster.

8. The method of claim 1, wherein parameter features are present in the parameter varying data such that the parameter varying data changes based on at least one parameter, and wherein the at least one parameter includes time.

9. The method of claim 1, wherein the maintenance pattern maintains a constant shape and magnitude value at a place where the electronic device is located even as time goes by.

10. The method of claim 1, wherein the first region is determined by periodically monitoring entry, exit or stay in/from the first region based on a received wireless signal, and
the received wireless signal includes at least one of a cellular wireless signal and a wireless LAN signal.

11. The method of claim 1, wherein setting a case to hypothesis comprises setting a measured magnetic field to a function of a magnetic field of the moving path data.

12. The method of claim 1, wherein setting the second hypothesis comprises hypothesizing that a measured magnetic field signal is a sum of a magnetic field signal at a place other than the first location and noise.

13. An electronic device comprising:
a sensor module configured to sense sensing data;
a wireless communication module configured to transmit or receive a wireless signal;
a memory configured to store a virtual marker platform; and
a processor operatively connected to the sensor module and the memory,
wherein the processor is configured to:
register a first location which is a specific indoor place as a virtual marker, wherein the virtual marker includes moving path data corresponding to the first location;
determine whether the electronic device enters a first region which is a region within a specific radius from the first location by positioning the electronic device;
responsive to determining that the electronic device entered the first region, obtain measurement data measured wirelessly by the electronic device;
compare parameter varying data of the moving path data with first data of the measurement data, wherein the parameter varying data is data with feature points in a pattern type stored in the virtual marker according to a place where the electronic device is located; and
responsive to the parameter varying data of the moving path data corresponding to the first data of the measurement data:
set a first hypothesis of entering the first region and advancing to the first location, and a second hypothesis of entering the first region and not advancing to the first location;
pre-process both maintenance pattern data of the moving path data and second data of the measurement data;
obtain a correlation on the pre-processed second data and the pre-processed maintenance pattern data;
obtain a vector distance between the pre-processed second data and the pre-processed maintenance pattern data;
obtain a code of the pre-processed second data and the pre-processed maintenance pattern data;
assign an order of a size of each sample of the pre-processed second data and the pre-processed maintenance pattern data;
determine whether the electronic device advances to the first location by comparing the correlation and the vector distance with specified threshold values respectively and comparing a pattern between the pre-processed second data and the pre-processed maintenance pattern data based on at least one of the code or the order; and
in response to determining that the electronic device advances to the first location, executing at least one of a health application or a payment application, associated with the first location or displaying an indication of an event occurring at the first location;
wherein the maintenance pattern data has a maintenance pattern for a moving path.

14. The electronic device of claim 13, wherein the processor is configured to:
receive an input indicating whether the electronic device entered the first location; and
when the determination that the electronic device has entered the first region is different from the input, modify a method of determining whether the electronic device has entered the first location.

15. The electronic device of claim 13, wherein the moving path data includes a magnetic field vector value measured based on coordinates for specifying at least one of a location, a direction of the electronic device, parameter values for a cellular signal, a wireless LAN signal, and Bluetooth signal based on the coordinates.

16. The electronic device of claim 13, wherein the processor is configured to:
   select data having a reliability of detecting a location or a direction of the electronic device in a signal type list of items exceeding a threshold value; and
   set a resource bit mask flag for a resource capable of being supported by the electronic device.

17. The electronic device of claim 16, wherein the processor is configured to:
   set a data bit mask flag for data, of which moving path discrimination is not less than a specified threshold value, to 1; and
   set the data bit mask flag for data, of which the moving path discrimination is less than the specified threshold value, to 0.

18. The electronic device of claim 16, wherein the processor is configured to:
   when determining that a user is close to the first location, perform an AND operation by using a data bit mask flag and the resource bit mask flag as inputs; and
   determine a resource necessary to generate the measurement data based on a result of the AND operation of the data bit mask flag and the resource bit mask flag.

\* \* \* \* \*